United States Patent
Ito

(10) Patent No.: US 10,432,814 B2
(45) Date of Patent: Oct. 1, 2019

(54) IMAGE FORMING APPARATUS CAPABLE OF PERFORMING A HIGH-SPEED STARTUP PROCESS IN RESPONSE TO A POWER-ON OPERATION, AND RECORDING MEDIUM

(71) Applicant: KONICA MINOLTA, INC., Chiyoda-ku, Tokyo (JP)

(72) Inventor: Hiroyasu Ito, Okazaki (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/970,481

(22) Filed: May 3, 2018

(65) Prior Publication Data
US 2018/0338057 A1   Nov. 22, 2018

(30) Foreign Application Priority Data
May 16, 2017   (JP) .................................. 2017-097350

(51) Int. Cl.
*G06F 11/14*   (2006.01)
*H04N 1/00*   (2006.01)
*H04N 1/32*   (2006.01)

(52) U.S. Cl.
CPC ..... *H04N 1/00891* (2013.01); *H04N 1/00206* (2013.01); *H04N 1/00209* (2013.01);
(Continued)

(58) Field of Classification Search
CPC ......... G03G 15/80; G06F 15/00; G06F 21/81; G06F 11/1417; G06F 2211/1097;
(Continued)

(56) References Cited

U.S. PATENT DOCUMENTS

| | | | |
|---|---|---|---|
| 7,302,698 B1 * | 11/2007 | Proudler | ................. G06F 21/57 713/187 |
| 7,328,320 B2 * | 2/2008 | Tabuchi | .............. G06F 11/1456 707/999.2 |

(Continued)

FOREIGN PATENT DOCUMENTS

JP   2014010470 A   1/2014

*Primary Examiner* — Benny Q Tieu
*Assistant Examiner* — Juan M Guillermety
(74) *Attorney, Agent, or Firm* — Holtz, Holtz & Volek PC

(57) ABSTRACT

A hardware processor of an image forming apparatus is able to obtain saving target information from a time of a power-off operation to a time of power supply interruption and to save the saving target information, in a nonvolatile storage of the image forming apparatus, as first snapshot data (for restoring a state at a predetermined time after firmware is activated). When a power-on operation is performed after the time of the power-off operation, the hardware processor determines whether to perform a first high-speed startup process using the first snapshot data as an apparatus startup process with respect to the image forming apparatus. When a determination is made to perform the first high-speed startup process, the hardware processor causes the display of the image forming apparatus to display, in a period in which a hardware initialization process in response to the power-on operation is being performed or immediately after the hardware initialization process is completed, an advance notice screen to be displayed before completion of startup in response to the power-on operation, the advance notice screen giving an advance notice that a transition to a user operable state following the power-on operation will be completed.

20 Claims, 25 Drawing Sheets

(52) U.S. Cl.
CPC ..... *H04N 1/00411* (2013.01); *H04N 1/00928* (2013.01); *H04N 1/32358* (2013.01)

(58) Field of Classification Search
CPC ............ G06F 11/1402; G06F 11/1446; G06F 11/1448; G06F 11/1456; G06F 11/1458; G06F 11/1471; G11C 2207/2227; G11C 2207/4067; H04N 5/232411; G05B 2219/23316; G05B 2219/25281; G05B 2219/25289; G05B 2219/25292; G08F 21/023

See application file for complete search history.

(56) References Cited

U.S. PATENT DOCUMENTS

| | | | |
|---|---|---|---|
| 9,268,392 B2 | 2/2016 | Kanematsu | |
| 9,958,929 B2 | 5/2018 | Kanematsu | |
| 2008/0034019 A1* | 2/2008 | Cisler | G06F 11/1456 |
| 2010/0033468 A1* | 2/2010 | Sugamata | G09G 3/344 |
| | | | 345/211 |
| 2012/0008165 A1* | 1/2012 | Tanaka | G06F 9/4418 |
| | | | 358/1.15 |
| 2013/0262898 A1* | 10/2013 | Preston | G06F 11/1417 |
| | | | 713/323 |
| 2013/0346738 A1* | 12/2013 | Kimura | G06F 11/1417 |
| | | | 713/2 |
| 2015/0324254 A1* | 11/2015 | Prasad | G06F 11/1402 |
| | | | 707/642 |
| 2017/0176917 A1* | 6/2017 | Ito | G03G 15/80 |
| 2017/0180582 A1* | 6/2017 | Kodama | H04N 1/00891 |

\* cited by examiner

DATA CONFIGURATION IN eMMC

IMAGE FORMING APPARATUS CAPABLE OF PERFORMING A HIGH-SPEED STARTUP PROCESS IN RESPONSE TO A POWER-ON OPERATION, AND RECORDING MEDIUM

The entire disclosure of Japanese Patent Application No. 2017-097350, filed May 16, 2017, is incorporated herein by reference in its entirety.

BACKGROUND

Technological Field

The present invention relates to an image forming apparatus such as a multi-functional peripheral (MFP) and technologies related to an image forming apparatus.

Description of the Related Art

There is a high-speed startup technique (also referred to as a hibernation startup technique or the like) with which a user can use the functions of an MFP in a short time when the user turns on a main power supply of the MFP (see Japanese Patent Application Laid-Open No. 2014-10470, for example). With this technique, it is possible to start up faster than with a normal startup process (a startup process which performs a hardware initialization process, a kernel activation process, a firmware activation process, and the like).

In the high-speed startup technique, supply of power is not terminated immediately in response to a turn-off operation of a main power switch, but even after the turn-off operation there is a period (a power supply continuation period) in which the supply of power is continued, and in the period a process is performed to store device state information (also referred to as saving target information). In more detail, to be ready for the next turning on of the main power switch, a process is performed to store, in a nonvolatile storage, the device state information (data in a random-access memory (RAM) of a controller, data stored in registers of processing units, and other data) at the time of turning off of the main power switch (the process is also referred to as a snapshot obtaining process). Then, when the main power switch is turned on again, the device state information (snapshot data) obtained in the immediately preceding snapshot obtaining process is used. By this operation, the MFP can fast return back to an activated state (in detail, the state (ready state) in which jobs can be performed).

In some cases, in such a high-speed startup process as described above (a high-speed startup process using snapshot data obtained in an immediately preceding snapshot obtaining process), the snapshot data is failed to be obtained. For example, if a user unplugs the alternating current (AC) plug from an AC outlet (plug receptor) before completion of a power supply continuation period following the turn-off operation of the main power switch (in other words, during an obtaining process of the snapshot data), the supply of power to the MFP is shut off, and the obtaining process of the snapshot data is thus interrupted, whereby valid snapshot data is not generated. That is, the snapshot data is failed to be obtained.

If the snapshot data is failed to be obtained as described above, such a high-speed startup process (also referred to as a first high-speed startup process) as described above is not performed at the next power-on operation. In this case, a normal startup process can be performed, for example. Alternatively, it can be considered that another high-speed startup process slower than the first high-speed startup process (also referred to as a second high-speed startup process) (the second high-speed startup process having a longer required time period than the first high-speed startup process) is performed.

The second high-speed startup process is realized, for example, by activating application software such as firmware after performing a returning process using the second snapshot data (to be described next) after the power-on operation. In this process, the second snapshot data is the data which is obtained as the snapshot data (the second snapshot data) representing the state in which processing has been completed up to a kernel activation process of an operating system (OS), and the second snapshot data is stored in a nonvolatile storage (an embedded Multi Media Card (eMMC) or the like). In the second high-speed startup process, after a process (a snapshot developing process) in which the second snapshot data is written back in the volatile storage is performed, a startup process of application software such as firmware is performed.

Note that in the first high-speed startup process, the snapshot data (first snapshot data) memorizing the state in which the application software such as firmware is also activated is used; thus, the startup process of the application software such as firmware itself is not performed. Therefore, the first high-speed startup process has a higher speed than the second high-speed startup process.

In a normal startup process, a required time period from when a power-on operation is performed to when an operation of a user can be accepted (when an operation screen is displayed) is quite long (for example, about one minute). In contrast, in the second high-speed startup process, the required time period is shorter (for example, about over 10 seconds) than in the normal startup process. Further, in the first high-speed startup process, the required time period is shorter (for example, a few seconds) than in the second high-speed startup process.

As described above, there is "variation" in the time period from immediately after the power-on operation to the completion of the startup of the MFP.

Meanwhile, in some cases, a user having performed a power-on operation of an MFP wants to roughly know how long the user has to wait until the MFP becomes operable. For example, if the user will be able to operate setting operations in about a few seconds, the user will wait without doing anything. However, if the user has to wait longer than about a few seconds until the user can perform setting operations, the user would like to do other work (paper replenishment work, work of setting documents in an automatic document feeder (ADF), or the like) in some cases.

As a technology to meet such a need, it can be considered to display an "advance notice screen" indicating that an operation screen will be displayed soon (the MFP will be operable soon), during a firmware activation process and a few seconds (for example, three seconds) before the operation screen is displayed. As the advance notice screen, a screen containing a logo (a corporate mark or the like) of an MFP manufacturer can be used, for example. In other words, the display of the screen containing the logo gives an advance notice that the MFP will be ready soon (the MFP transitions to the operable state). The user can know, based on whether the advance notice screen is displayed, whether the time left until the MFP becomes operable is shorter or longer than a predetermined time, for example, a few seconds.

The above advance notice screen may be displayed during the firmware activation process, in the normal startup process and the second high-speed startup process.

However, in the first high-speed startup process, since the returning process is performed using the first snapshot data (the snapshot data for restoring the state at a predetermined time after the firmware and the like are activated), the firmware activation process itself is not performed. Therefore, it is impossible to display the advance notice screen during the firmware activation process, and it is thus not easy to display the advance notice screen in the first high-speed startup process.

To address this issue, it can be considered to display the advance notice screen at a predetermined time after the power-on operation (for example, immediately after the hardware initialization process) without exception. Note that in this case, the advance notice screen functions normally when the first high-speed startup process is performed; however, the advance notice screen does not function normally when the second high-speed startup process or the normal startup process is performed. In detail, when the first high-speed startup process is performed, the MFP actually transitions to the operable state in about a few seconds after the advance notice screen is displayed; therefore, the advance notice screen functions normally. On the other hand, when the second high-speed startup process or the normal startup process is performed, the required time period from when the advance notice screen is displayed to when the MFP transitions to the operable state needs to be longer than a few seconds (for example, about over 10 seconds to over 20 seconds); therefore, the advance notice screen does not function normally. The user who sees the advance notice screen can determine (expect) that the MFP will transition to the operable state in about a few seconds; however, the user has to wait a period longer than a few second, contrary to expectation.

SUMMARY

The present invention aims to provide an image forming apparatus that enables a user to more accurately know information related to a transition to an operable state after a power-on operation when a high-speed startup process is performed, and also aims to provide technologies related to the image forming apparatus.

A first aspect of the present invention provides an image forming apparatus including: a volatile storage; a nonvolatile storage; a hardware processor; and a display. The hardware processor tries to obtain, from the volatile storage, saving target information related to the image forming apparatus in a power supply continuation period from a time of a power-off operation to a time of power supply interruption and to store the saving target information in the nonvolatile storage as first snapshot data for restoring a state at a predetermined time after firmware of the image forming apparatus is activated. The hardware processor determines, when a power-on operation is performed after the time of the power-off operation, whether to perform a first high-speed startup process using the first snapshot data as an apparatus startup process with respect to the image forming apparatus. When a determination is made to perform the first high-speed startup process using the first snapshot data, the hardware processor causes the display to display, in a period in which a hardware initialization process in response to the power-on operation is being performed or immediately after the hardware initialization process is completed, an advance notice screen to be displayed before completion of startup in response to the power-on operation, the advance notice screen giving an advance notice that a transition to a user operable state following the power-on operation will be completed.

A second aspect of the present invention provides a non-transitory computer-readable recording medium that records a program for causing a computer installed in an image forming apparatus to perform: a) obtaining, from a volatile storage of the image forming apparatus, saving target information related to the image forming apparatus in a power supply continuation period from a time of a power-off operation to a time of power supply interruption, and storing the saving target information in a nonvolatile storage of the image forming apparatus as first snapshot data for restoring a state at a predetermined time after firmware of the image forming apparatus is activated; b) determining, when a power-on operation is performed after the time of the power-off operation, whether to perform a first high-speed startup process using the first snapshot data as an apparatus startup process with respect to the image forming apparatus; and c) causing a display of the image forming apparatus to display an advance notice screen to be displayed before completion of startup in response to the power-on operation, the advance notice screen giving an advance notice that a transition to a user operable state following the power-on operation will be completed. In the step c), when a determination is made to perform the first high-speed startup process using the first snapshot data, the advance notice screen is displayed on the display in a period in which a hardware initialization process in response to the power-on operation is being performed or immediately after the hardware initialization process is completed.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 8 is a diagram showing a first high-speed startup process and the like;

FIG. 9 is a diagram showing a second high-speed startup process and the like;

FIG. 10 is a diagram showing a normal startup process (a non-high-speed startup process) and the like;

FIG. 13 is a partially enlarged view of FIG. 8 and is a diagram showing the first high-speed startup process and the like;

FIG. 14 is a partially enlarged view of FIG. 9 and is a diagram showing the second high-speed startup process and the like;

FIG. 15 is a partially enlarged view of FIG. 10 and is a diagram showing the second high-speed startup process and the like;

DETAILED DESCRIPTION OF EMBODIMENTS

Hereinafter, one or more embodiments of the present invention will be described with reference to the drawings. However, the scope of the invention is not limited to the disclosed embodiments.

<1. Device Configuration>

Figure 1:
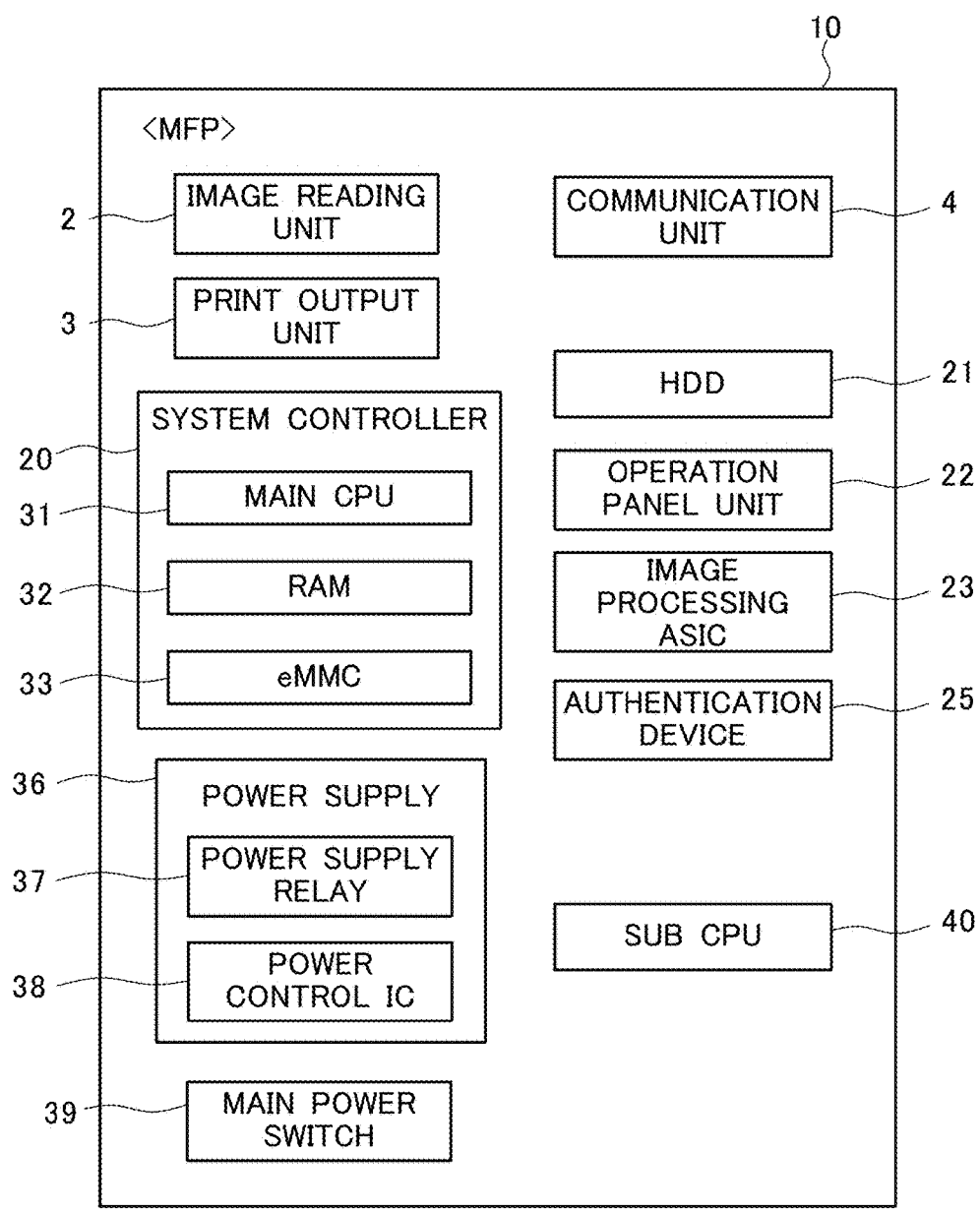
FIG. 1 is a diagram showing function blocks of an image forming apparatus.
Figure 2:
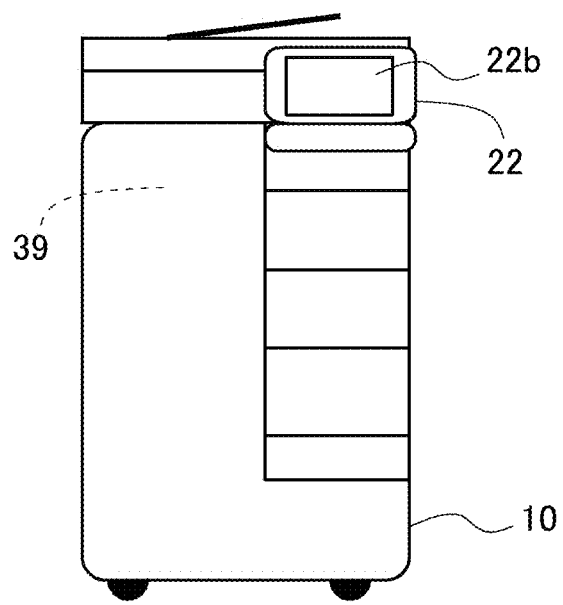
FIG. 2 is a diagram showing an outer appearance of the image forming apparatus.

FIG. 1 is a diagram showing function blocks of an image forming apparatus 10. In this embodiment, a multi-functional peripheral (MFP) is described as an example of the image forming apparatus 10. Further, FIG. 2 is an external view of the MFP 10.

The MFP 10 is an apparatus (also referred to as a multi-functional peripheral) equipped with a scan function, a copy function, a facsimile machine function, a box storage function, and the like. Specifically, as shown in the function block diagram of FIG. 1, the MFP 10 is equipped with an image reading unit 2, a print output unit 3, a communication unit 4, a system controller 20, a hard disk drive (HDD) 21, an operation panel unit 22, an image processing application specific integrated circuit (ASIC) 23, an authentication device 25, a power supply 36, and the like, and the MFP 10 realizes various functions by causing these units to operate in combination.

The image reading unit 2 is a processing unit which optically reads (in other word, scans) a document placed on a predetermined position on the MFP 10 to generate image data (also referred to as a document image or a scan image) of the document. The image reading unit 2 is also referred to as a scanning unit.

The print output unit 3 is an output unit which prints out an image on various media such as paper, based on data related to a print object.

The communication unit 4 is a processing unit which can perform facsimile communication through a public line or the like. Further, the communication unit 4 can also perform communication through a communication network (the communication is referred to as network communication).

The HDD 21 is a nonvolatile storage device (a storage) having a relatively large capacity and can store large-volume data of images and the like.

As shown also in the external view of FIG. 2, the operation panel unit 22 is an operation unit having a touch panel 22b on the front face side. The touch panel 22b is configured with a liquid crystal display panel having various sensors and the like embedded therein, and the touch panel 22b can display various information and receive various operation inputs from an operator. In other words, the touch panel 22b is a display to display various information, and at the same time, is an operation input unit to receive an operation input from a user.

The image processing ASIC 23 is an integrated circuit for image processing. The image processing ASIC 23 can perform various image processing (a gamma adjustment process, a color adjustment process, an image compression process, and the like) on image data.

The authentication device 25 is an authentication device (a user authentication device) to be connected to a main body of the MFP 10 through a USB connection system or the like. As the authentication device 25, a device can be used which employs any of various user authentication methods, for example, a card authentication method, a vein authentication method, or the like.

The system controller 20 is a control device which is built in the MFP 10 and totally controls the MFP 10. The system controller 20 is configured as a computer system equipped with a main central processing unit (CPU) 31, various semiconductor memories (a volatile memory such as a RAM 32, and a nonvolatile memory such as an eMMC (embedded Multi Media Card) 33), and the like. The system controller 20 realizes various processing units by executing, on the main CPU 31, a predetermined software program (hereinafter, simply referred to as a program as well) stored in the eMMC 33.

The program (in detail, a group of program modules) includes a boot program, an OS including a kernel, an application software of the MFP (firmware of the MFP), and the like.

Further, the program may be installed in the MFP 10 via a communication network. Alternatively, the program may be recorded in a portable recording medium (in other words, a non-transitory computer-readable recording medium) such as a USB memory and may be read out from the recording medium to be installed in the MFP 10.

Figure 3:
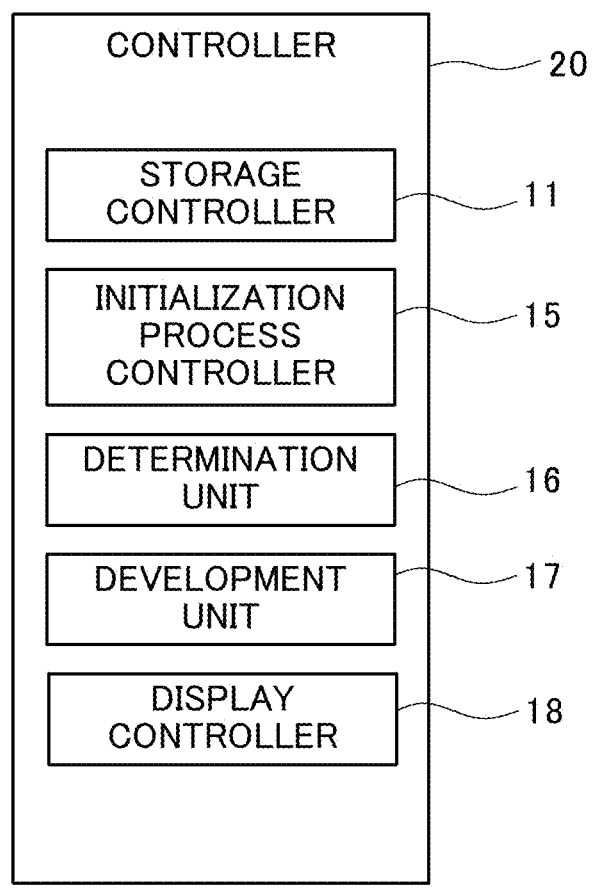
FIG. 3 is a diagram showing processing units each realized in association with execution of a program.

As shown in FIG. 3, the system controller (main CPU 31 and the like) 20 realizes, by executing the above programs, various processing units including a storage controller 11, an initialization process controller 15, a determination unit 16, a development unit 17, and a display controller 18.

The storage controller (also referred to as a snapshot obtaining unit) 11 is a processing unit which obtains, as snapshot data, device usage information (information used on the apparatus 10 including the devices thereof) about the processing units (for example, all the connected devices also including the devices currently connected to MFP 10 (the devices of an option configuration)) which are targets of the snapshot obtaining process. Then, the storage controller 11 stores (saves) the device usage information related to each unit of the MFP 10, in the eMMC 33 as the "snapshot data" (first snapshot data D1 and the like). Note that the device usage information is also referred to as saving target information because the device usage information is target information of a saving process.

The initialization process controller 15 is a processing unit which performs an initialization process on each device of the MFP 10.

The determination unit 16 is a processing unit which determines, when a power-on operation is performed after a time of a power-off operation, whether to perform a first high-speed startup process using the first snapshot data D1 as an apparatus startup process (operation) with respect to the MFP. The determination unit 16 performs a determination process during a boot process immediately after a power-on operation.

The development unit 17 performs a high-speed startup process, if necessary, in cooperation with the initialization process controller 15 and the like. For example, at the time of a subsequent power-on operation after a power-off operation of the MFP 10 or other times, the development unit 17 develops, on the MFP 10, the snapshot data D1 obtained in the snapshot obtaining process immediately after the power-off operation. By using the snapshot data D1, it is possible to startup the MFP 10 quickly.

The display controller 18 is a processing unit which controls display operation of the operation panel unit 22. The display controller 18 controls an operation for causing an advance notice screen (which is to be described later and which gives an advance notice of completion of a transition to a user operable state after a power-on operation) or the like to be displayed.

Further, the MFP 10 is also provided with a main power switch 39. The main power switch 39 (a power switch) is a switch for switching between an on-state and an off-state of the MFP 10. As the main power switch 39, a seesaw switch is used, for example. Further, the main power switch 39 is disposed, for example, on a main body part of the MFP 10 covered by an openable cover (on the inside of the cover) in order to prevent erroneous operations.

The power supply 36 has an alternating current to direct current (AC-DC) converter (not shown) and can use the AC-DC converter to supply electric power from an AC power source (power having been converted to direct current) to each unit of the MFP 10 (the main CPU 31, the RAM 32, the eMMC 33, the sub CPU 40, the other processing units 21, 22, 23, 25, 2, 3, and 4, and the like). Further, the power supply 36 has a power supply relay 37 and a power control IC 38. The power supply relay 37 (an electromagnetic relay or the like) switches between on and off of the power supplied to the power control IC 38. The power control IC 38 is an IC which controls supply of power to each unit of the MFP 10 and uses the power supplied from the power supply relay 37 to control the supply of power to each unit of the MFP 10. The power supply 36 controls the supply of power to each unit of the MFP 10 in cooperation with the main CPU 31, the sub CPU 40 (to be described next), and the like.

Further, the MFP 10 is provided also with the sub CPU 40. In a state where an AC plug of the MFP 10 is connected to an AC outlet, the sub CPU 40 is constantly supplied with power (the sub CPU 40 is operating in a power-on state), and the sub CPU 40 can perform various operations (a monitor process, a determination process, and the like). The sub CPU 40 can monitor operation states of the main CPU 31 and the main power switch 39 and can control the supply of power to each unit of the MFP 10 in cooperation with the power supply 36 and the like.

For example, the sub CPU 40 performs a first snapshot obtaining process in cooperation with the main CPU 31 in response to a turn-off operation of the main power switch 39 and then interrupts the supply of power to each unit of the MFP 10 in cooperation with the main CPU 31 and the power supply 36. Further, the sub CPU 40 resumes the supply of power to each unit of the MFP 10 including the system controller 20 (the main CPU 31 and the like) in cooperation with the power supply 36 in response to a turn-on operation of the main power switch 39. In response to the power-on operation, the startup process of the MFP (a hardware initialization process and the like) is started.

The sub CPU 40 realizes various processing units (a power control unit and the like) by executing predetermined programs stored in a predetermined storage (not shown) under a management of the sub CPU 40. The power control unit controls an operation of supplying power on the MFP 10 in cooperation with the power supply 36. Note that the program (in detail, a group of program modules) may be installed in the MFP 10 through a communication network. Alternatively, the program may be recorded in a portable recording medium (in other words, a non-transitory computer-readable recording medium) such as a USB memory so that the program is read out from the recording medium and installed in the MFP 10.

<2. Three Types of Startup Processes>

In the MFP 10, a high-speed startup technique (also referred to as a hibernation startup technique) by which a user becomes able to use the MFP in a short time is employed when a turn-on operation of the main power switch 39 (also referred to as a main power-on operation or simply referred to as a power-on operation) is performed.

In the MFP 10, two types of high-speed startup processes are selectively adopted. One is a first high-speed startup process and the other is a second high-speed startup process. These two types of high-speed startup processes are selectively used depending on conditions. Note that as will be described later, any of the high-speed startup processes is not performed in some conditions. In that case, a normal startup process is performed. Of these three types of startup processes, the first high-speed startup process is the fastest startup process. Further, the second high-speed startup process is slower than the first high-speed startup process but is faster than the normal startup process. For example, a startup time TM3 of the normal startup process is relatively long (about one minute); however, a startup time TM2 of the second high-speed startup process is about over 10 seconds to over 20 seconds, and a startup time TM1 of the first high-speed startup process is about a few seconds (TM3>TM2>TM1) (see FIG. 6).

Figure 6:
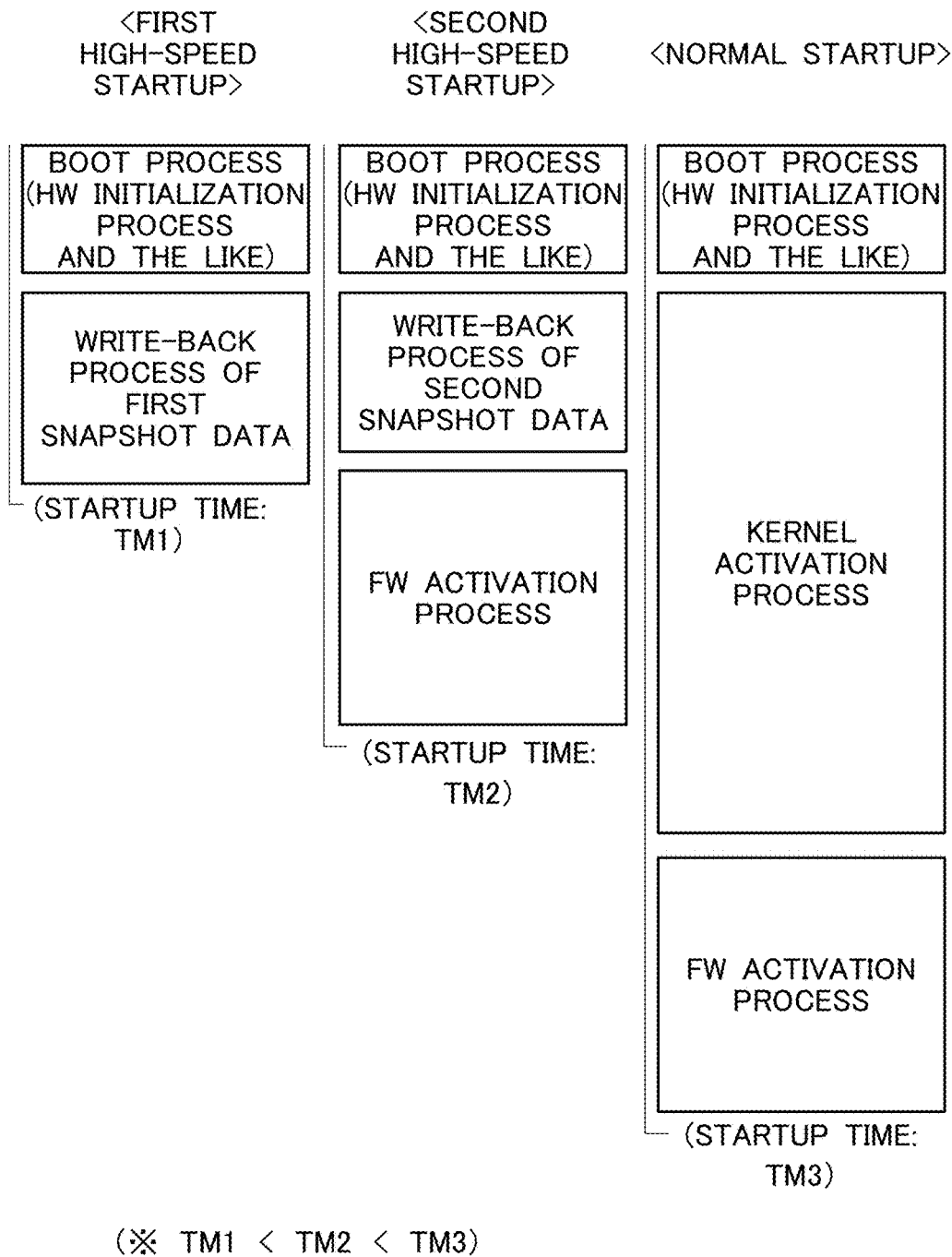
FIG. 6 is a diagram showing three types of startup processes.

FIG. 6 is a diagram showing the three types of startup processes. On the MFP 10, the three types of startup processes are selectively used depending on conditions.

<2-1. Normal Startup Process>

As shown in FIG. 6, in the normal startup process, after a power-on operation (the turn-on operation of the main power switch 39), a boot process (an initialization process of hardware (HW) and the like), a kernel activation process (an OS activation process), and an application activation process for the MFP (here, a firmware (FW) activation process (for the MFP)) are performed in this order. Note that in particular, the normal startup process is a startup process accompanied by both of the kernel activation process and the firmware activation process, and the two processes need quite a long time. Therefore, the normal startup process needs a startup time (TM3) longer than the other two types of startup processes (the two high-speed startup processes).

<2-2. First High-Speed Startup Process>

In the first high-speed startup process, a high-speed startup process using the snapshot data D1 to be described next is performed. In the first high-speed startup process, the boot process (an initialization process of hardware and the like) is performed; however, neither the kernel activation process nor the firmware activation process is performed. After the boot process is completed, a write-back process (also referred to as a developing process or an expanding process) of the first snapshot data D1 is performed. This process enables a high-speed startup. The first snapshot data D1 is the snapshot data for restoring a state at a predetermined time after the firmware is activated.

Figure 8:
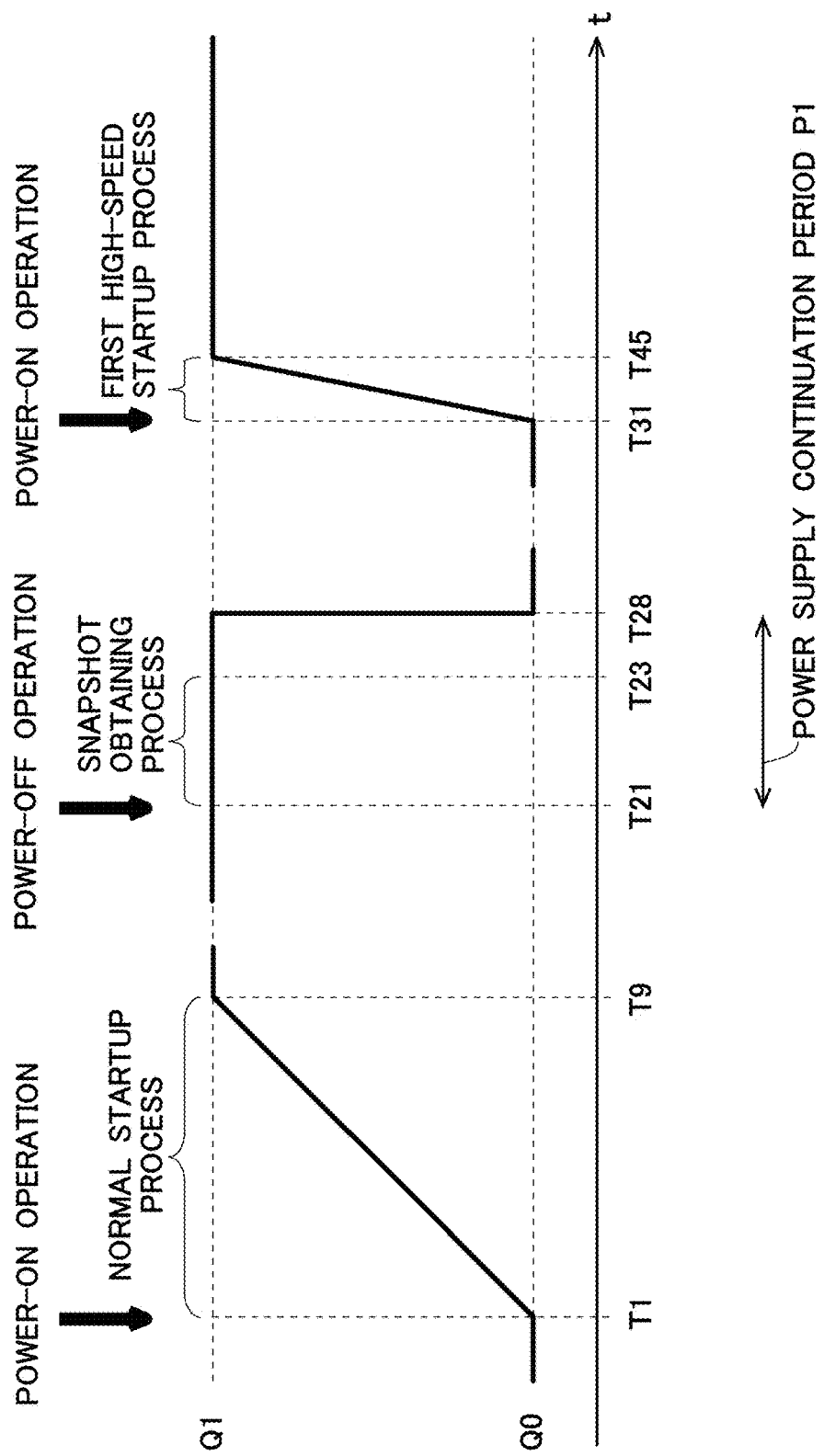

First, as shown also in FIG. 8, when the turn-off operation of the main power switch 39 (also referred to as a main power-off operation or simply referred to as a power-off operation) (time T21) is performed, the saving process (a storing process) of the device usage information (the saving target information) is performed in a power supply continuation period P1 at and after the time of the turn-off operation (see FIG. 8), on preparation for the next turning on (time T31) of the main power switch 39. In short, the saving process of the snapshot data D (D1) for the first high-speed startup process is performed.

Specifically, a process (also referred to as a first snapshot obtaining process) is performed in which the saving target information of the MFP 10 (data in the RAM 32 of the controller, data in registers and/or memories of the processing units, and other data) is stored (memorized) in nonvolatile storages (the eMMC 33 and the like). In detail, the storage controller 11 obtains the device usage information about the target devices (hardware processing units) from the volatile storages of the MFP 10 (the RAM 32, the registers and memories of the hardware processing units, and other storages) and stores the obtained information in the nonvolatile storage of the MFP 10 (the eMMC 33 or the like) as the snapshot data D (in detail, the first snapshot data D1).

Then, when the main power switch 39 is turned on again (at time T31), the data (the first snapshot data D1) obtained in the immediately preceding first snapshot obtaining process is written back (developed) from the nonvolatile storage of the MFP 10 (the eMMC 33 or the like) in the volatile storage of the MFP 10 (the RAM 32, the registers and memories of the hardware processing units, and other storages). The write-back process (the developing process) of the snapshot data is also referred to as a snapshot developing process. Since the first snapshot data D1 is used, the MFP 10 can be returned quickly back to a ready state Q1 (in other words, the state in which a user operation is possible) (quick startup is possible).

Specifically, as shown in FIG. 8, the MFP 10 obtains the saving target information about the MFP 10 as the snapshot data D (D1) in the power supply continuation period P1 from the time of the power-off operation (the power shut-off operation) (for example, time T21) to a time of power-interruption T28 in response to the power-off operation, and stores the obtained data in the eMMC 33 (the nonvolatile memory). Then, when the next power-on operation following the power-off operation (at and after time T31) is performed, the snapshot data D1 is used, and the startup time is thus shortened, whereby the MFP 10 starts quickly.

<2-3. Second High-Speed Startup Process>

In the second high-speed startup process, the high-speed startup process is performed using the snapshot data D2 stored in advance in the eMMC 33. The snapshot data D2 is data different from the snapshot data D1. The snapshot data D2 includes various data which has been saved in the state where processing has completed up to the boot process (the initialization process of the hardware and the like) and the kernel activation process (the OS activation process) in the normal startup process and which represents the state of the apparatus at that time. The snapshot data D2 can be also expressed as the snapshot data for restoring the state at a time immediately after the kernel activation process is completed and immediately before the firmware activation process is started.

As shown in FIG. 6, in the second high-speed startup process, the boot process (the initialization process of the hardware and the like) and the firmware activation process are performed, but the kernel activation process is not performed. Specifically, immediately after the boot process is completed, the write-back process of the snapshot data D2 (the process of writing the second snapshot data D2 from the nonvolatile storage back in the volatile storage) (also referred to as a second snapshot developing process) is performed. This process restores a state equivalent to the state when the boot process (a hardware initialization process and the like) and the kernel activation process (the OS activation process) have been completed. Then, after the write-back process of the snapshot data D2, the firmware activation process is performed. This enables the quick startup (compared with the normal startup process).

<3. General Description of Operation>

Figure 11:
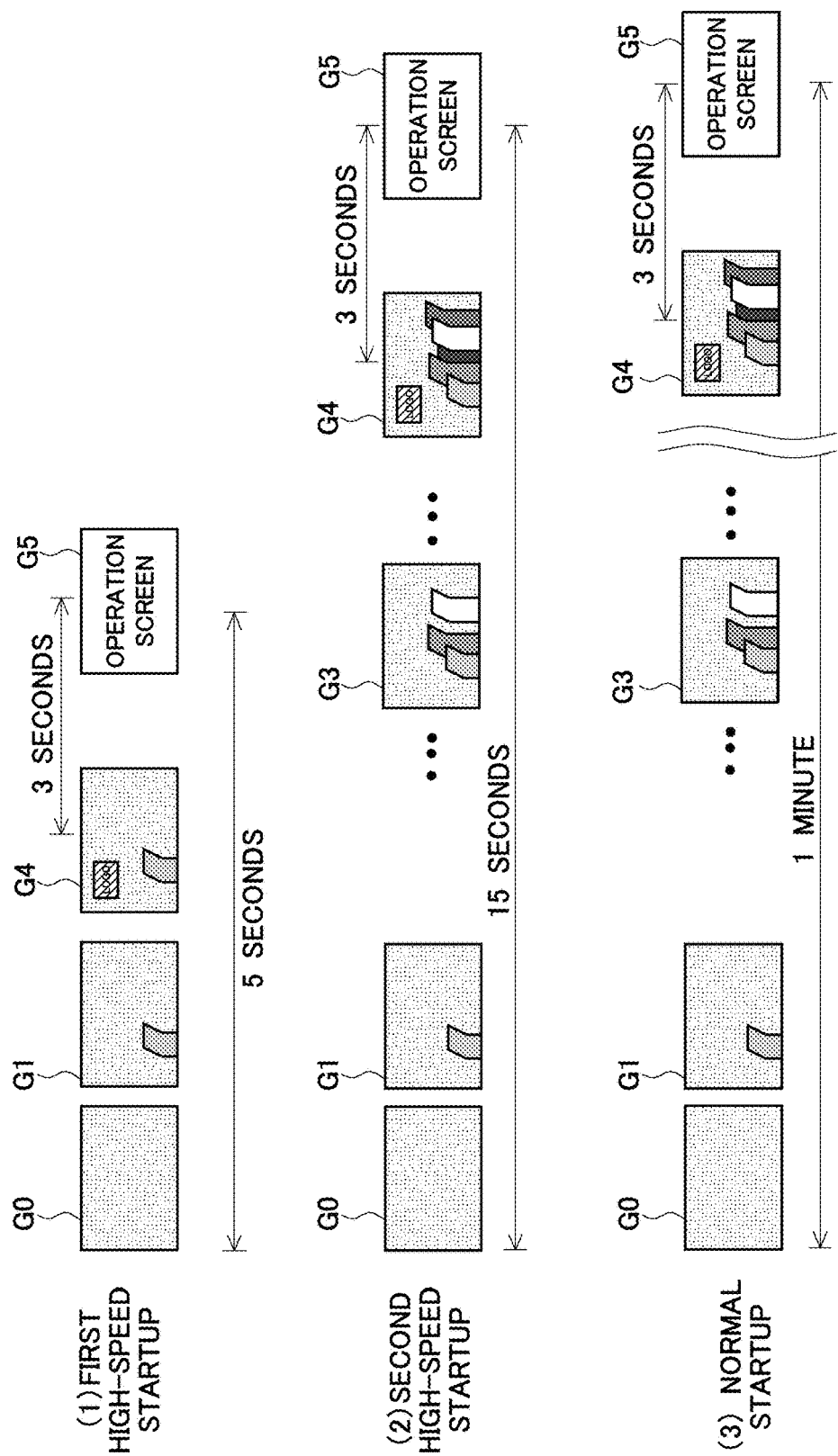
FIG. 11 is a diagram showing a screen transition on an operation panel.

FIG. 11 is a diagram showing transitions of a startup screen (the screen displayed on the operation panel unit 22 during a startup process of the MFP) and the like of the present embodiment. The uppermost section of FIG. 11 shows startup screens G0, G1, and G4 and an operation screen G5 which are sequentially displayed when the first high-speed startup process is performed in response to a power-on operation. The middle section of FIG. 11 shows startup screens G0, G1, G3, and G4 and an operation screen G5 which are sequentially displayed when the second high-speed startup process is performed in response to a power-on operation. The lowermost section of FIG. 11 shows startup screens G0, G1, G3, and G4 and an operation screen G5 which are sequentially displayed when a normal startup process is performed in response to a power-on operation.

Figure 12:
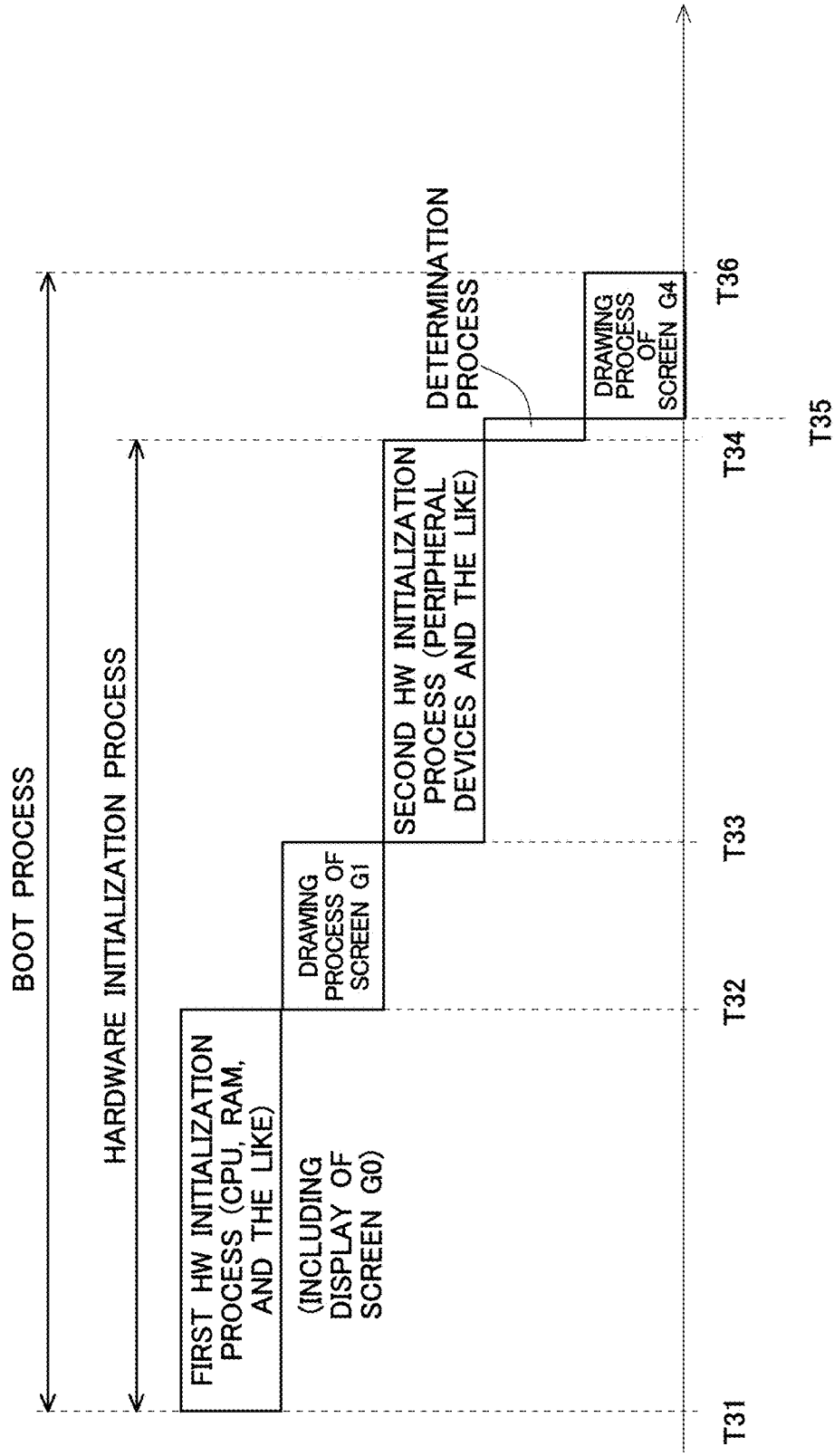
FIG. 12 is a diagram showing a boot process.
Figure 16:
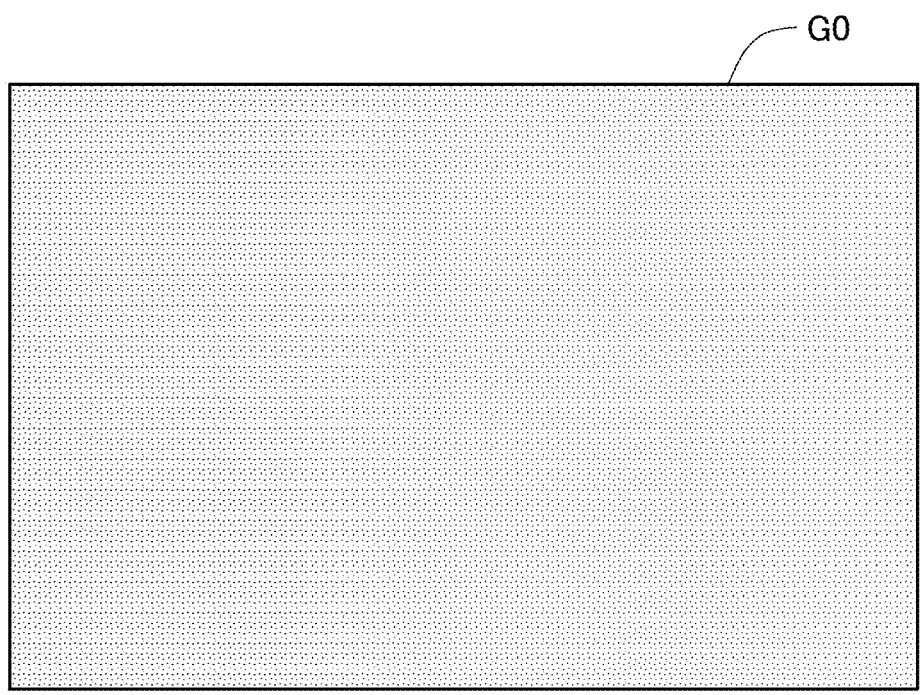
FIGS. 16 to 19 are diagrams each showing a startup screen.
Figure 17:
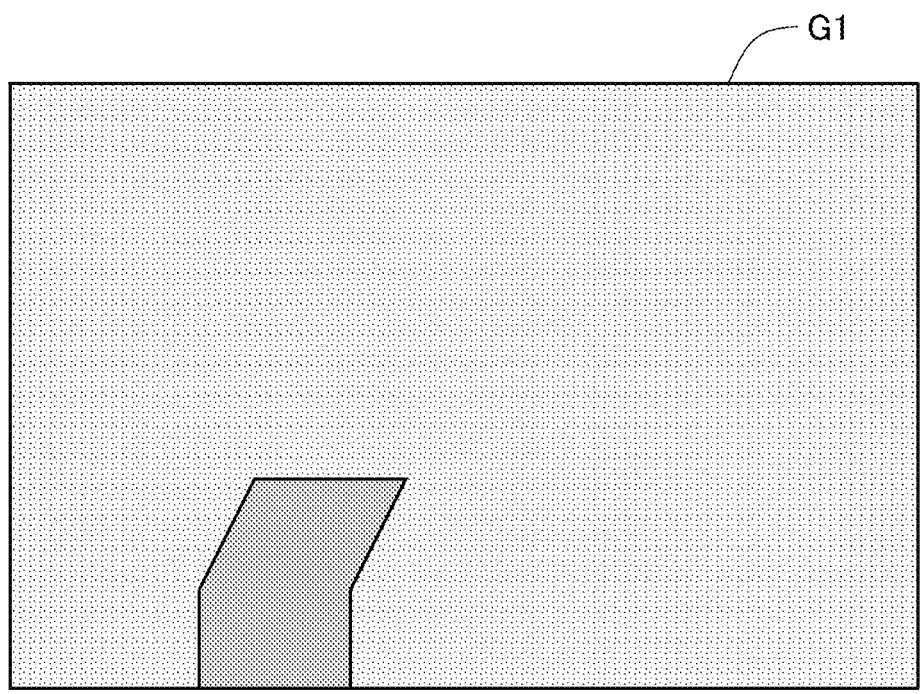

Also when any one of the above three types of startup processes is performed in response to a power-on operation, the screen G0 (FIG. 16) is first displayed in a boot process period (in detail, in the first hardware initialization process period from time T31 to time T32) (see also FIG. 12). Next, in the boot process period (in detail, in a period immediately after the first hardware initialization process is completed (from time T32 to time T33)), the screen G1 (FIG. 17) is displayed (see also FIG. 12). Note that FIG. 12 is a diagram showing details and the like of the boot process (including the hardware initialization process and the like) to be performed by the boot program.

Here, the screen G0 is a black screen over the entire surface of the touch panel 22b of the operation panel unit 22. The screen G0 is displayed as an all black screen, because pixel values of all pixels in a display memory of the operation panel unit 22 are set to zero in an initialization process of the operation panel unit 22 in the first hardware initialization process.

Further, the screen G1 is a screen for showing, immediately after a power-on operation (which is an operation of pressing down the main power supply button), that the power-on operation has been accepted, and is also referred to as a power-on operation reception notification screen. The screen G1 is a screen different from the screen G0 and has a specific figure (a combined figure in which a parallelogram is disposed adjacent to the upper part of a rectangle) in which an operation unit of the MFP is designed. By the screen G1 having the specific figure part (in other words, a part specific to the screen G1) being displayed, the fact that the press-down operation of the main power supply button has been accepted and other information are shown to the user. The screen G1 is displayed after the first hardware initialization process (immediately after the initialization process of a part of the hardware (which is basic hardware (specifically, the CPU 31, the RAM 32, and the operation panel unit 22)) is completed). Further, the screen G1 is displayed after the power-on operation and before the determination process (from time T34 to time T35) to be described later (see FIG. 12) in step S54 (see FIG. 5). In this way, the screen G1 is displayed (at this timing) regardless of which of the three types of startup processes is performed (regardless of whether a determination is made to perform the first high-speed startup process).

After that, different startup screens are displayed depending on which of the three types of startup processes is performed.

Figure 18:
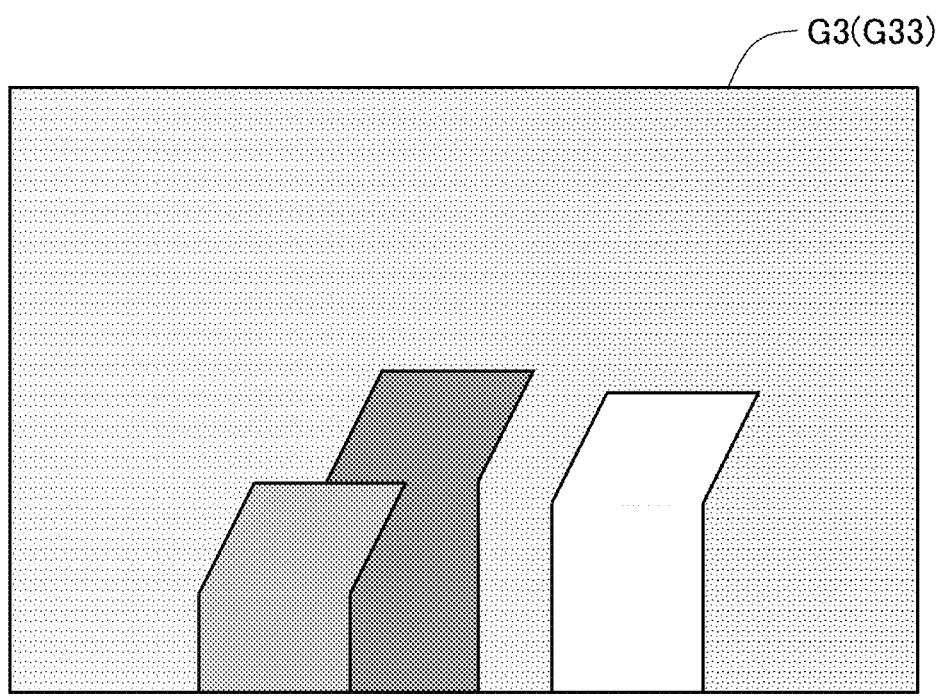
Figure 19:
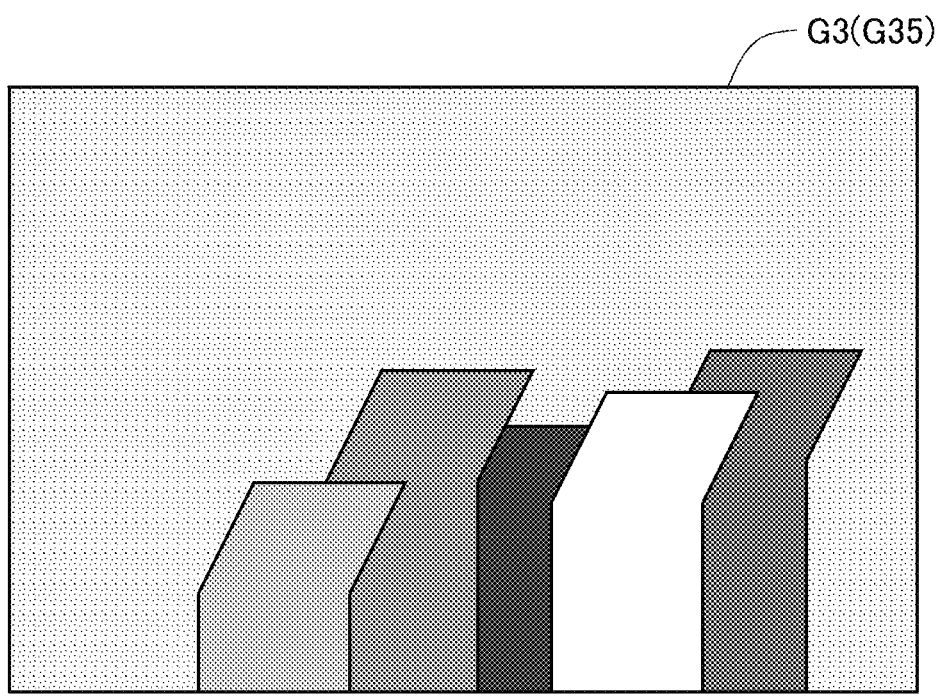

If the normal startup process is performed, one or more than one startup screens G3 (for example, a screen G33 (FIG. 18), a screen G35 (FIG. 19), and the like) showing that the MFP startup process (apparatus startup process) is on progress are updated and displayed at predetermined time intervals (for example, intervals of a few seconds) while the firmware activation process is running. The startup screen G3 is also expressed as a progress notification screen which shows that the startup process is running. The startup screen G3 is updated and displayed every time when the process reaches the next step of a plurality of steps in the apparatus startup process following the power-on operation. For example, the screens G3 (G33, G35, and the like), in which the number of the above specific figures (each are combined figure in which a parallelogram is disposed adjacent to the upper part of a rectangle) is sequentially increased, are sequentially displayed according to the progress of the startup process. In the screen G33 (FIG. 18), the three specific figures are displayed, and in the screen G35 (FIG. 19), the five specific figures are displayed.

After that, at time T48 at which the firmware activation process is being performed (in detail, at time T48 a few second prior to time T49 at which the startup process is completed) (see FIG. 15), the startup screen G4 (also referred to as an advance notice screen) is displayed (in detail, the startup screen G4 begins to be displayed). The advance notice screen G4 is kept displayed until immediately before the operation screen G5 is displayed.

Figure 20:
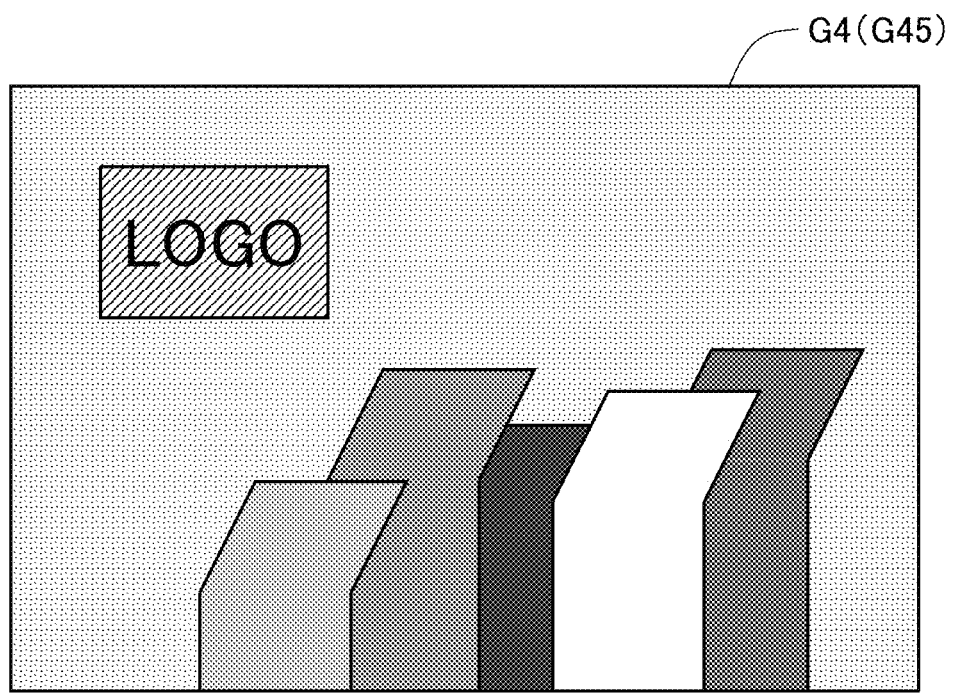
FIG. 20 is a diagram showing an advance notice screen.
Figure 21:
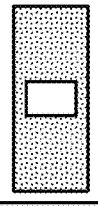
FIG. 21 is a diagram showing an operation screen (a copy menu screen).

The advance notice screen G4 is a screen giving an advance notice that the transition to the user operable state following the power-on operation will be completed, and is a screen to be displayed before the completion of the startup in response to the power-on operation (a predetermined time before (for example, a few seconds before) an estimated completion time of the startup). In short, the advance notice screen G4 is a screen indicating that the operation screen G5 (see FIG. 21) will be displayed soon (indicating that the MFP will be operable soon). In this embodiment, a screen including a logo of the MFP manufacturer including a corporate mark, a symbol mark, or the like is used as the advance notice screen G4. In more detail, the advance notice screen G4 (G45) (see FIG. 20) is a screen in which a logo is added on the upper left part in the screen G3 (for example, G35) (FIG. 19) having been displayed on the operation panel unit 22 until immediately before. Further, the operation screen G5 is the first operation screen to be displayed after the completion of the apparatus startup process. An example of the operation screen G5 is a top menu screen of copy job (a copy menu screen) or the like as shown in FIG. 21.

During the firmware activation process, the advance notice screen G4 is displayed a few seconds (for example, three seconds) before the operation screen G5 is displayed, thereby giving an advance notice that the MFP will be ready soon (in other words, the MFP will transition to the operable state soon). The displayed advance notice screen G4 enables the user to know that the time left until the MFP becomes operable is shorter than a predetermined time, for example, a few seconds. In other words, the user can know, based on whether the advance notice screen G4 is displayed, whether the time left until the MFP becomes operable is shorter or longer than a predetermined time, for example, a few seconds.

Also in the case that the second high-speed startup process is performed, a screen is displayed which is similar to the screen in the case that the normal startup process is performed. In particular, at time T46 while the firmware activation process is being performed (in detail, time T46 which is a few seconds before time T47 at which the startup process is completed) (see FIG. 14), the advance notice screen G4 is displayed.

Using the second snapshot data makes the time period required for the second high-speed startup process shorter than the time period required for the normal startup process (in more detail, the start time of the startup of the firmware is earlier in the second high-speed startup process than in the normal startup process); thus, the startup screens G3 and G4 are displayed at an earlier stage in the second high-speed startup process than in the normal startup process. For example, the advance notice screen G4 is displayed at time T46 in the second high-speed startup process, and time T46 is earlier than above time T48, which is the display start time of the advance notice screen G4 in the case that the normal startup process is performed. However, the time period from the display start time of the advance notice screen G4 to the display start time of the operation screen G5 is almost the same in the second high-speed startup process and in the normal startup process.

Also in the second high-speed startup process, the displayed advance notice screen G4 enables the user to know that the time left until the MFP becomes operable is shorter than a predetermined time (for example, a few seconds).

As described above, in the case that the first high-speed startup process using the first snapshot data D1 is not performed, the advance notice screen G4 is displayed in the firmware activation process period (in the period of performing the firmware activation process) after the hardware initialization process in response to the power-on operation is completed.

Figure 22:
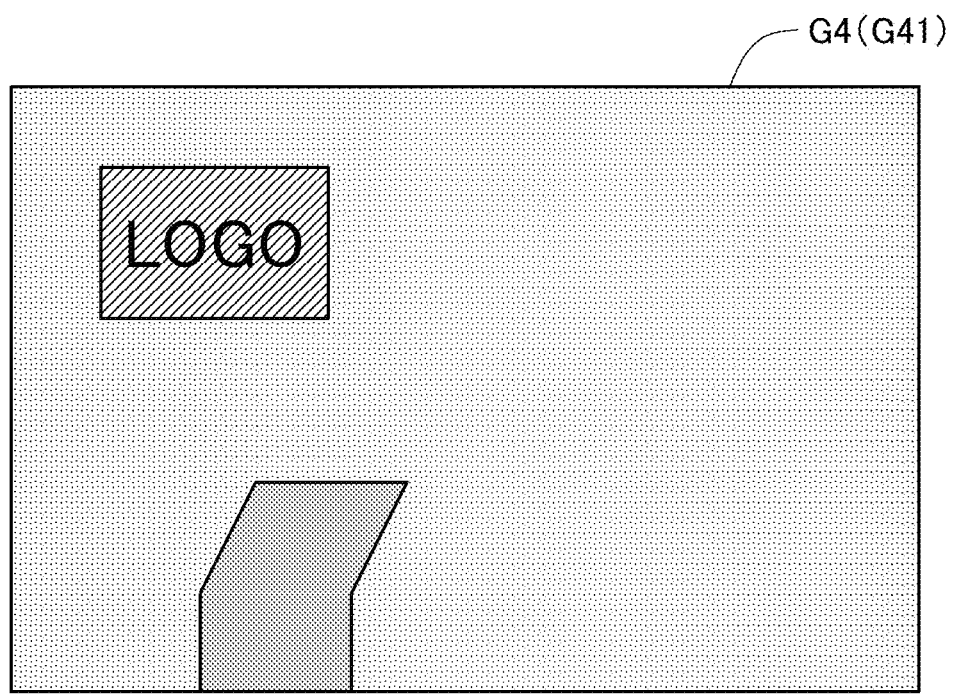
FIG. 22 is a diagram showing an advance notice screen.

On the other hand, in the case that the first high-speed startup process is performed, the advance notice screen G4 is displayed not in the firmware activation process period but in the boot process period, that is, in the period of the process performed by the boot program. Specifically, immediately after the hardware initialization process in response to the power-on operation is competed (in detail, after the startup screen G1 is displayed and immediately after the second hardware initialization process is completed) (from time T35 to time T36) (see FIG. 12), a process of drawing the advance notice screen G4 is performed to display the advance notice screen G4 (see also step S61 of FIG. 5 to be described later). More specifically, immediately after the second initialization process (from time T33 to time T34), a determination process (which is related to the determination whether to perform the first high-speed startup process as an apparatus startup process related to the MFP and other determinations (step S54 (see FIG. 5)) (from time T34 to time T35) is performed; and immediately after the determination process, the advance notice screen G4 (G41) is displayed (in detail, the startup screen G4 begins to be displayed). This advance notice screen G41 (see FIG. 22) is a screen in which a logo is added on the upper left part in the screen G1 (see FIG. 17) having been displayed on the operation panel unit 22 until immediately before. The advance notice screen G4 is kept displayed until immediately before the operation screen G5 is displayed.

Figure 13:
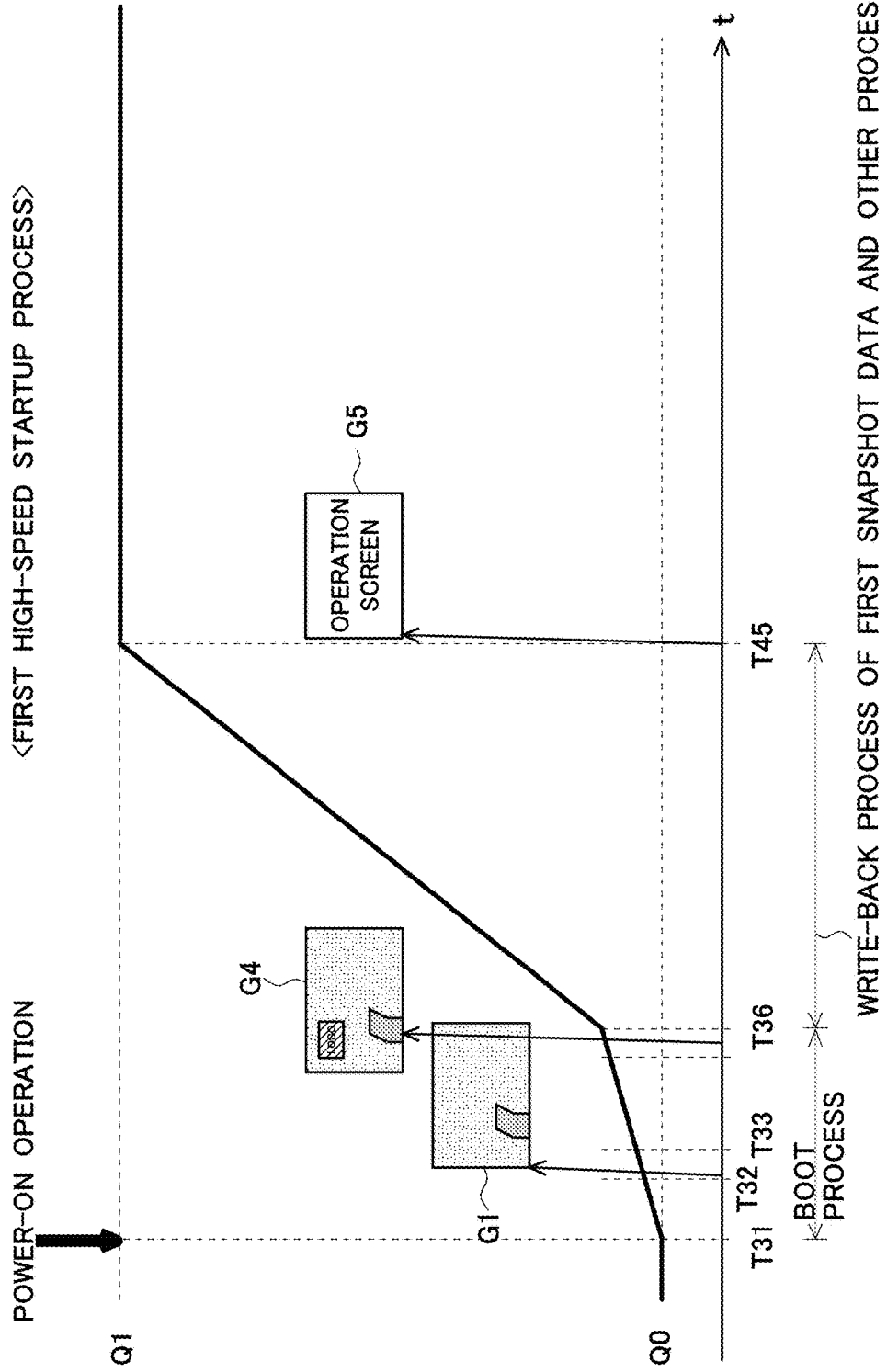
Figure 14:
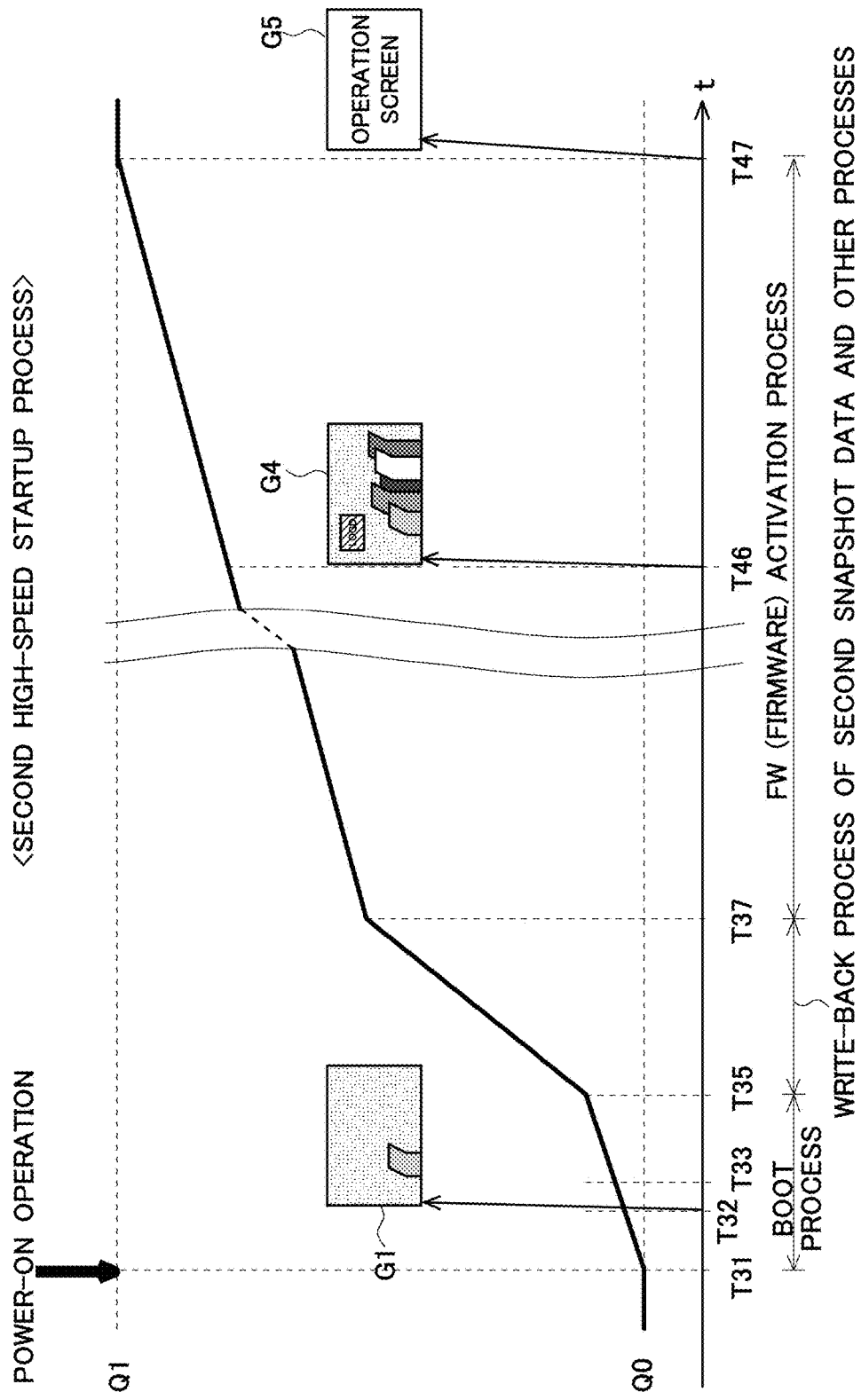
Figure 15:
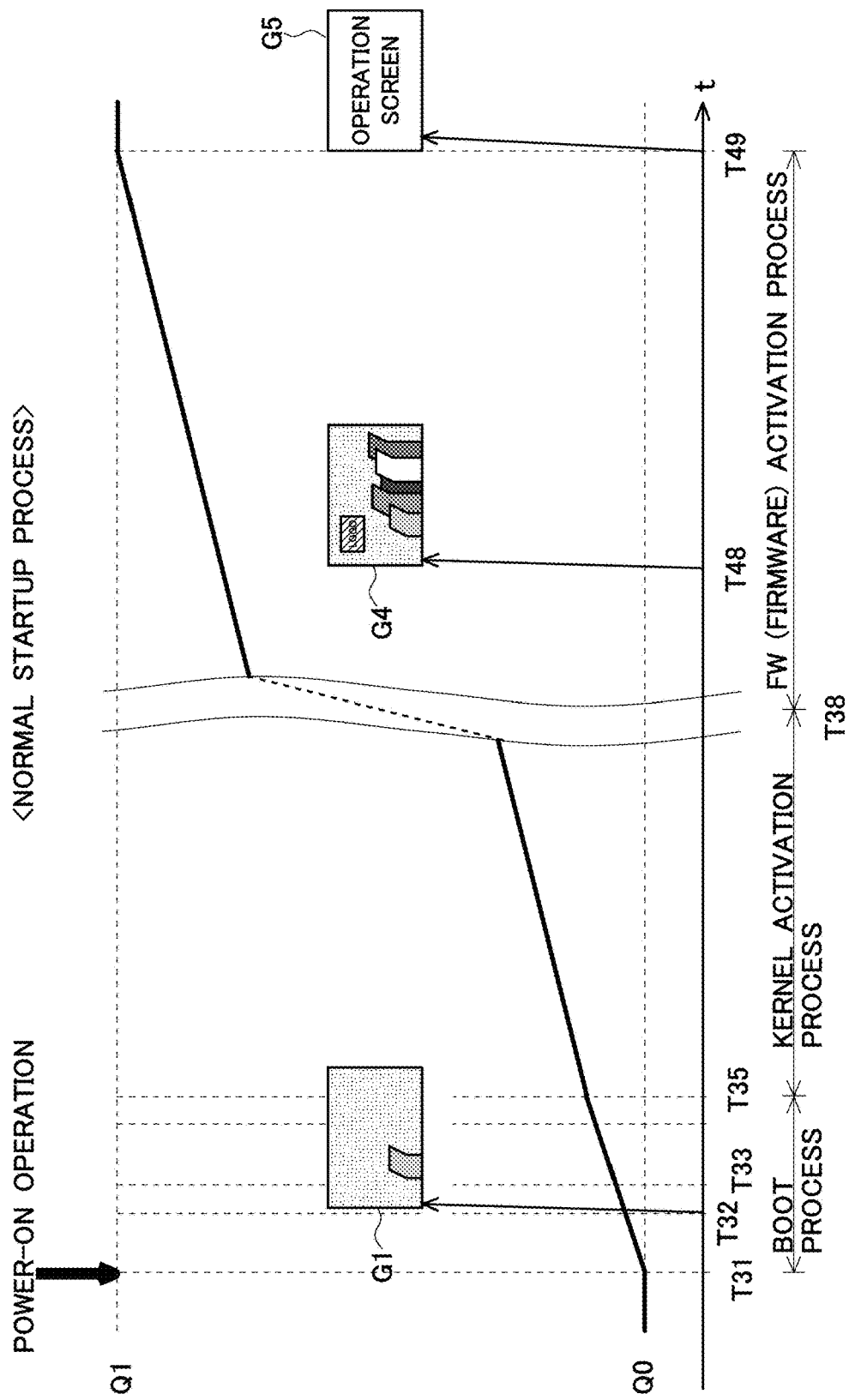

Here, the advance notice screen G4 is displayed in the first high-speed startup process at a time (from T35 to time T36) (see also FIG. 13), which is earlier than the above times T46 and T48 (see FIGS. 14 and 15. However, the time period (for example, a few seconds) from the display start time of the advance notice screen G4 (G41) to the display start time of the operation screen G5 in the first high-speed startup process is almost the same (about the same) as the time period from the display start time of the advance notice screen G4 (G45) to the display start time of the operation screen G5 in the normal startup process or the second high-speed startup process.

By the operation described above, when the first high-speed startup process, which is a startup process of the MFP and is not accompanied by the firmware activation process itself, is performed, the advance notice screen G4 is displayed at time T36, which is a few second before the display start time T45 (see FIG. 13) of the operation screen G5; therefore, the user can know more accurately the information about the transition to the operable state following the power-on operation.

<4. Detailed Description of Operation>

Figure 4:
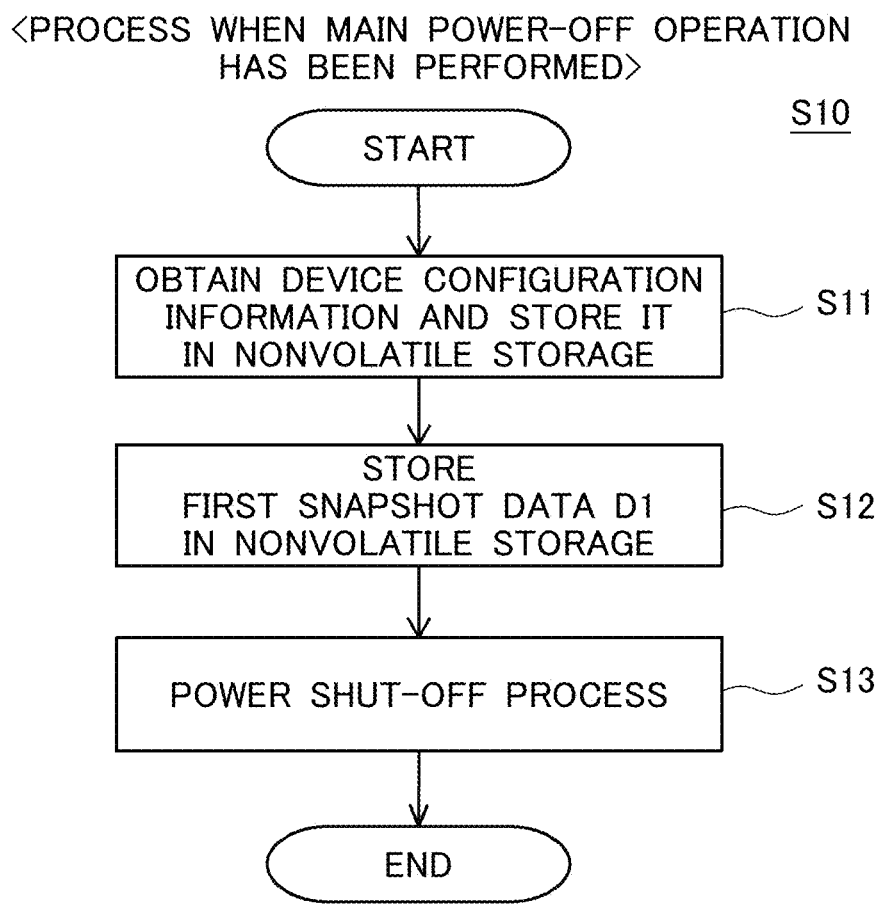
FIG. 4 is a flowchart showing an operation when a power-off operation has been operated.
Figure 5:
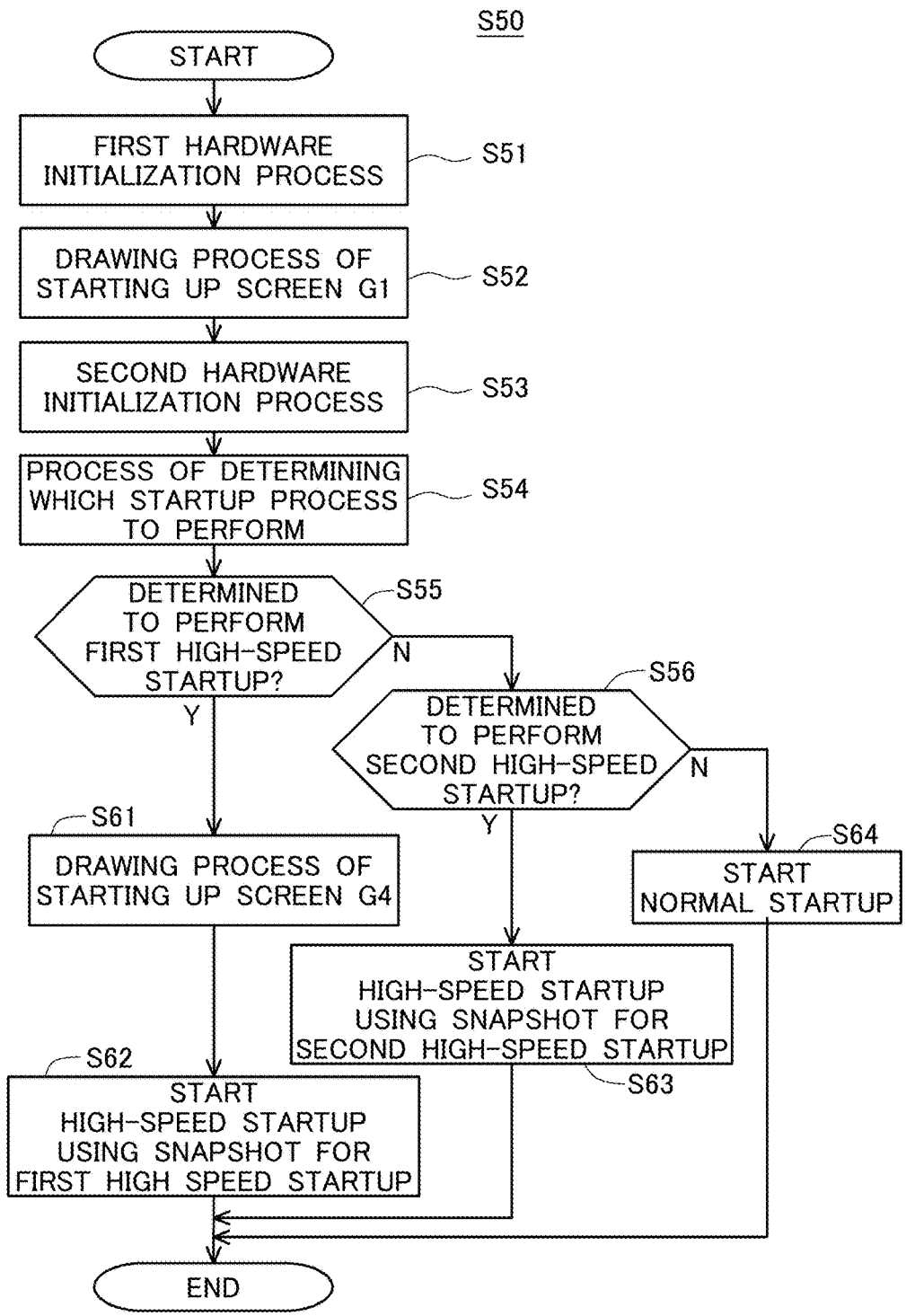
FIG. 5 is a flowchart showing an operation when a power-on operation has been performed.
Figure 9:
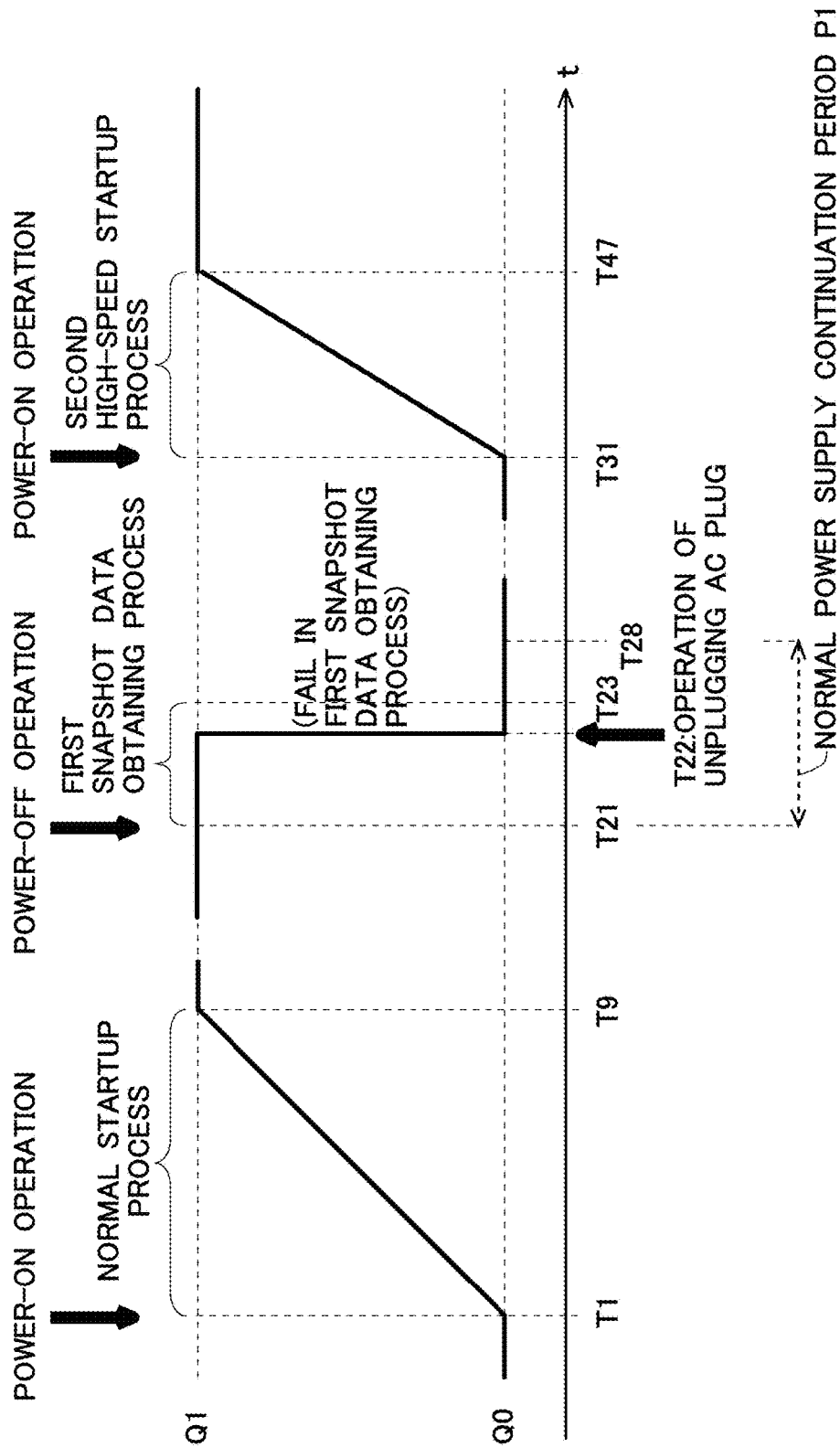
Figure 10:
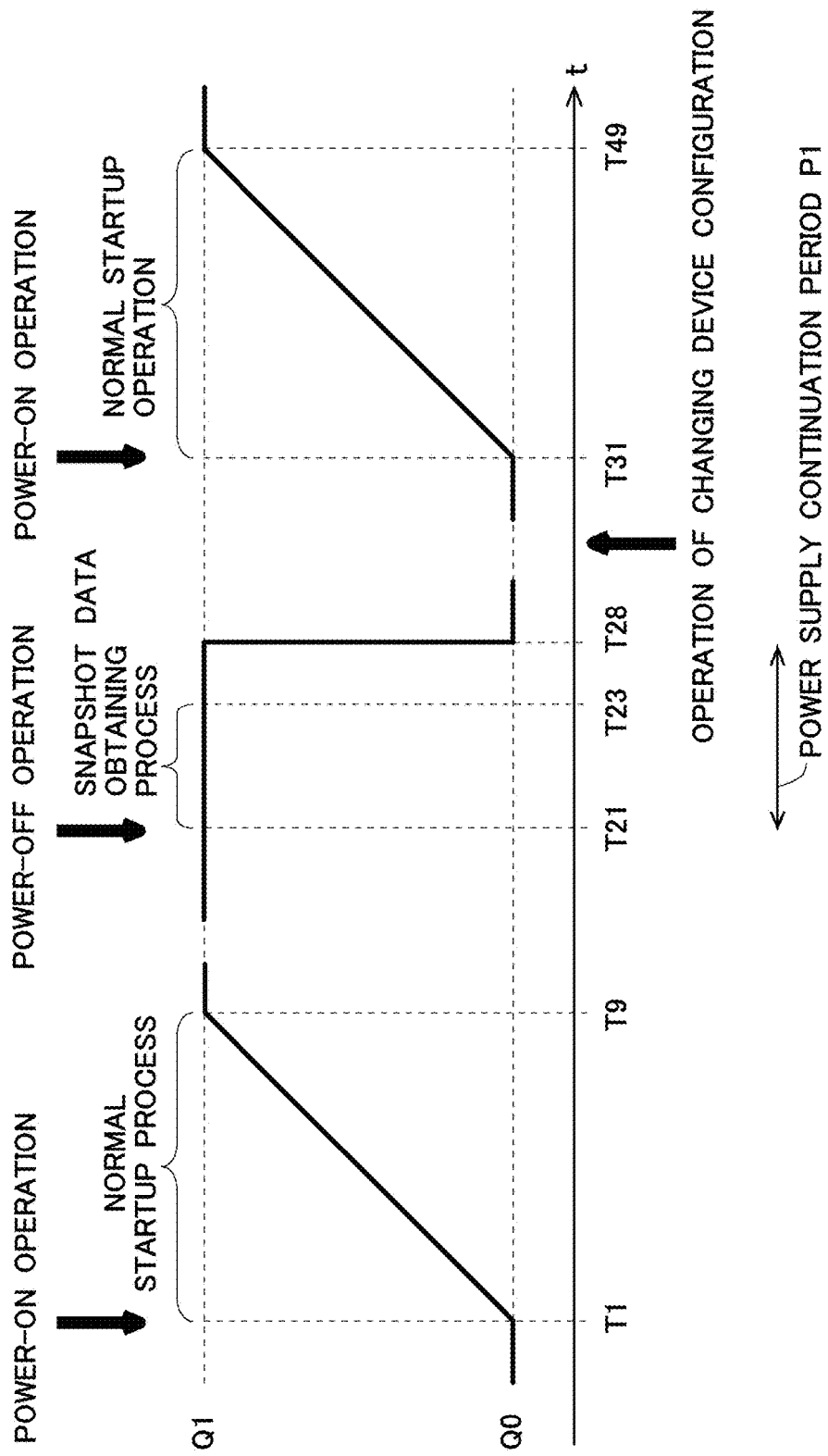

FIG. 4 is a flowchart showing the operation when a power-off operation has been performed, and FIG. 5 is a flowchart showing the operation when a power-on operation has been performed. Further, FIGS. 8 to 10 are timing charts showing operation examples in the case that a power-off operation is performed after the transition to the activated state (also referred to as a startup completion state) in response to a power-on operation, and then a power-on operation is performed again. FIG. 8 shows how the first high-speed startup process using the first snapshot data D1 is performed immediately after the second power-on operation. FIG. 9 shows how the second high-speed startup process using the second snapshot data D2 is performed immediately after the second power-on operation. Further, FIG. 10 shows how the normal startup process is performed immediately after the second power-on operation. Note that, with reference to FIGS. 8 to 10, any one of the three types of startup processes is performed when a power-on operation (the second power-on operation) is performed again after the MFP has been started up by the normal startup process (from time T1 to time T9) and then a power-off operation has been performed.

As shown in FIG. 8, when the normal startup process is performed in response to a power-on operation at time T1 (for example, at the time of starting work), the MFP 10 transitions from a power-off-state Q0 to the activated state (in more detail, the ready state Q1 (a standby state)) (at time T9 or the like). Note that FIGS. 9 and 10 also show how the normal startup process is first performed from time T1 to time T9 similarly.

<First Snapshot Obtaining Process in Response to Power-Off Operation>

After that, the MFP is appropriately used, and then, a power-off operation is performed at an appropriate time, for example, at the time of finishing work.

Hereinafter, with reference to FIG. 4, the operation when a power-off operation has been performed will be described.

In the ready state Q1, when the power-off operation using the main power switch 39 is received at time T21 (see also FIG. 8 and the like), the MFP 10 performs an operation as shown in FIG. 4 (step S10).

Specifically, in step S11, the device configuration information (the information representing the device configuration of the MFP 10) at the time of the power-off operation is obtained. For example, the MFP 10 communicates in advance with each optional device connected to the MFP 10 so as to identify the device type (for example, a device type ID and the like) of each optional device and stores in advance the identification results in the volatile storage (the RAM 32 or the like). In this step S11, by reading out the stored information from the device in which the information is stored, the device configuration of the MFP 10 at the time of the power-off operation (time T21 (see FIG. 8 and the like)) is obtained (grasped), and the read-out information is stored in the nonvolatile storage (specifically, the eMMC 33, the HDD 21, or the like).

Figure 7:
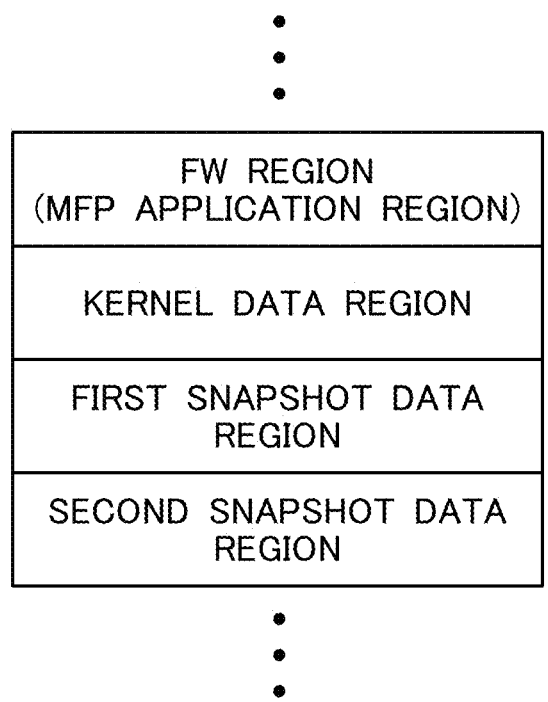
FIG. 7 is a diagram showing data in an eMMC.

Next, in step S12, the MFP 10 performs the snapshot obtaining process (in the period from time T21 to time T23 (see FIG. 8 and the like)). Specifically, the MFP 10 obtains the saving target information about a plurality of devices (for example, the devices 20, 22, 23, and 25) as the snapshot data D1 and stores the snapshot data D1 in the eMMC 33 (the nonvolatile memory) (see also FIG. 7).

In more detail, for example, the data stored in the RAM 32 or the like (the data is the device usage information (the saving target information)) for use by the system controller 20 (also referred to as a main body processing unit) of the MFP 10 is included in the saving target information (that is, the snapshot data D1). For example, the values of state variables representing the option configuration and the like of the MFP 10 and the image data and the like on which the option configuration is reflected are included in the saving target information (that is, the snapshot data D1). The saving target information in the system controller 20 of the MFP 10 is transferred from the RAM 32 or the like to the eMMC 33 and is stored.

Further, for example, the saving target information (the device usage information (the data used by the devices 22, 23, and 25 (the values of state variables and the like))) about the devices 22, 23, and 25 (the hardware processing units) are also included in the saving target information (that is, the snapshot data D1). The saving target information (the data in the register and/or memories of the hardware processing units) about the devices (the hardware processing units) 22, 23, and 25 are once copied (transferred and stored) from the hardware processing units into the RAM 32 and then is further transferred to the eMMC 33 and stored.

As described above, when the power-off operation is performed using the main power switch 39, a process (the first snapshot obtaining process) is performed in which the saving target information about the MFP 10 (the saving target information on which the state of the MFP at the time of the power-off operation is reflected) is stored (saved) in the nonvolatile storage (specifically, the eMMC 33). That is, the obtaining process of the snapshot data D1 (the saving process of the saving target information) is performed.

After that, at time T28 (FIG. 8) at which the power supply continuation period P1 has elapsed since time T21, the supply of power from the power supply 36 to each unit (except the sub CPU 40) of the MFP 10 is shut off (whereby the voltage drops).

If the operation is normally performed after the power-off operation, the above operations are performed, and the valid snapshot data D1 is stored in the eMMC 33.

<Operations after Power-on Operation>

Next, with reference to FIG. 5, operations after a power-on operation will be described.

When the second power-on operation (the next power-on operation after the power-off operation (time T21)) is performed using the main power switch 39 at time T31 (see FIG. 8 and the like), the MFP 10 performs the process shown in FIG. 5. Specifically, first, a program (the boot program)

for the boot process (including the hardware initialization process and the like) is activated, and the process from steps S51 to S64 is performed by the boot program.

In step S51, the first hardware initialization process is performed. Specifically, the initialization of the CPU 31 and the RAM 32 is performed, and the initialization of the operation panel unit 22 and the initialization and the like of a communication interface between the operation panel unit 22 and the system controller 20 are performed. During this first hardware initialization process (specifically, during the period from time T31 to time T32 of FIG. 12), the screen G0 (see FIGS. 11 and 16) is displayed on the operation panel unit 22.

In step S52, the drawing process (a display process) of the startup screen G1 (see FIG. 17) is performed. For example, in the period from time T32 to time T33 of FIG. 12, the process of drawing the startup screen G1 is performed to display the startup screen G1 (which is the power-on operation reception notification screen) on the operation panel unit 22.

In step S53, the second hardware initialization process is performed. Specifically, for example, in the period from time T33 to time T34 of FIG. 12, it is determined whether an optional devices (an authentication device, a finisher device, or the like) (also referred to as peripheral devices) are present, the device configuration information is obtained, and an initialization process is performed on the optional devices and the like.

Then, in step S54, the MFP 10 performs a process of determining the startup process to be performed (specifically, the determination process related to the determination on which startup process to perform).

The MFP 10 determines to perform the first high-speed startup process using the valid first snapshot data D1 under the condition that the valid first snapshot data D1 is stored in the nonvolatile storage. Further, the MFP 10 determines to perform the first high-speed startup process or the second high-speed startup process under the condition that the device configuration information at the time of the power-on operation (time T31) is identical with the device configuration information at the time of the power-off operation (time T21).

For that purpose, the MFP 10 first determines whether the device configuration (an optional device or the like) of the MFP 10 has been changed in the power-off period.

Specifically, the MFP 10 first communicates with each optional device connected to the MFP 10 and identifies the device type (for example, the device type ID) and the like of each optional device, and the MFP 10 thus obtains (grasps) the device configuration of the MFP 10 at the time of the power-on operation (time T31). Then, it is determined whether the device configuration at the time of the power-on operation (time T31) is identical with the device configuration at the time of the immediately preceding power-off operation (time T21). In more detail, a comparison is made between the device configuration information obtained in step S11 in response to the immediately preceding power-off operation at time T21 and the device configuration information obtained in step S53 in response to the power-on operation at time T31 next to the power-off operation at time T21. On the basis of the comparison result, it is detected whether any change in the device configuration of the MFP 10 has been made in the power-off period, that is, whether the change in the device configuration is present. For example, if the authentication device 25 is detached from the MFP 10 in the power-off period (including the case where the authentication device 25 has been renewed) or if a finisher device has been newly added, the device configuration is determined to have been changed.

Further, the MFP 10 determines whether the snapshot data D1 has been successfully obtained in response to the immediately preceding power-off operation. Specifically, it is determined whether the valid snapshot data D1 is stored in the eMMC 33.

If the operation of obtaining the snapshot data D1 in response to the immediately preceding power-off operation (step S12 of FIG. 4) has been successful, the valid snapshot data D1 is stored in the eMMC 33. Note that if the operation of obtaining the snapshot data D1 (the operation of storing the snapshot data D1 in the eMMC 33) is completed, information (flag information or the like) indicating that the snapshot data D1 stored in the eMMC 33 is valid is attached. On the basis of the presence or absence of the information or the like, it is determined whether the valid snapshot data D1 is present (in other words, whether the operation of obtaining the immediately preceding snapshot data D1 has been successful).

On the other hand, if the operation of obtaining the snapshot data D1 in response to the immediately preceding power-off operation has not been successful, the valid snapshot data D1 is not stored in the eMMC 33. For example, if a user unplugs the AC plug from an AC outlet (a plug receptor) before completion of the power supply continuation period following the turn-off operation of the main power switch (in other words, during the period of obtaining process of the snapshot data), the supply of power to the MFP is shut off, and the obtaining process of the snapshot data is thus interrupted, whereby valid snapshot data is not generated.

In step S54, based on the two conditions (the presence or absence of the change in the device configuration, and the presence or absence of the valid snapshot data D1), the determination process related to which startup process to perform is performed. In other words, at the time when the power-on operation is performed following the time of the power-off operation, a determination is made on whether to perform the first high-speed startup process using the first snapshot data D1.

If the device configuration information at the time of the power-off operation (time T21) and the device configuration information at the time of the power-on operation (time T31) are different, a determination is made to perform the normal startup process. In short, if the device configuration is determined to have been changed, it is determined that, instead of the high-speed startup process, the normal startup process should be performed. In other words, if a determination is made, due to the fact that a first condition C1 (that the device configuration information at the time of the power-on operation (time T31) is identical with the device configuration information at the time of the power-off operation (time T21)) is not satisfied, not to perform the first high-speed startup process, a determination is made to perform the normal startup process.

On the other hand, if the device configuration information at the time of the power-on operation is identical with the device configuration information at the time of the power-off operation and if the valid first snapshot data is not stored in the nonvolatile storage, a determination is made to perform the second high-speed startup process using the second snapshot data. Specifically, if a determination is made that the device configuration has not been changed and the valid snapshot data D1 is not stored in the eMMC 33, a determination is made to perform the second high-speed startup process instead of the first high-speed startup process. In other words, if a determination is made, due to the fact that a second condition C2 (that the valid snapshot data D1 is stored in the eMMC 33) is not satisfied, not to perform the first high-speed startup process, a determination is made to perform the second high-speed startup process using the second snapshot data.

Further, if the device configuration information at the time of the power-on operation is identical with the device configuration information at the time of the power-off operation and if the valid first snapshot data is stored in the nonvolatile storage, a determination is made to perform the first high-speed startup process using the first snapshot data. Specifically, if a determination is made that the device configuration has not been changed and the valid snapshot data D1 is stored in the eMMC 33, it is determined that the first high-speed startup process should be performed. In other words, if the two conditions C1 and C2 are both satisfied, a determination is made to perform the first high-speed startup process.

In steps S55 and S56, branch processes are performed on the basis of the determination result in step S54.

If it is determined that the normal startup process should be performed, the process goes to step S64 via steps S55 and S56. In step S64, the kernel activation process and the firmware activation process are subsequently performed (see FIGS. 6 and 10). Specifically, the kernel program of the OS is activated (the kernel activation process is performed), and the firmware program is then activated (the firmware activation process is performed).

In this case, as shown also in the lowermost section of FIG. 11, following the startup screens G0 and G1, the startup screens G3 and G4 are sequentially displayed, and the operation screen G5 is then displayed.

Note that FIG. 15 is an enlarged view of the state at and after time T31 of FIG. 10. FIG. 15 shows the state in which the advance notice screen G4 is displayed a few seconds before the operation screen G5. Further, in FIG. 13 (to be described later) to FIG. 15, the screens G0 and G3 are omitted.

In particular, if a determination is made to perform the normal startup process, the advance notice screen G4 is displayed (at time T48) in the firmware activation process period (from time T38 to time T49) after the hardware initialization process in response to the power-on operation is completed and after the kernel activation process is completed. Then, at time T49, which is a few seconds after the display start time of the advance notice screen G4 (time T48), the operation screen G5 is displayed (see FIG. 15).

On the other hand, if it is determined that the second high-speed startup process should be performed, the process goes to step S63 via steps S55 and S56. In and after step S63, the developing process (the write-back process) of the second snapshot data D2 and the firmware activation process are subsequently performed (see FIGS. 6 and 9). Specifically, in step S63, a specific program for the second high-speed startup process is called from the boot program and is activated. Then, the specific program for the second high-speed startup process performs a developing process of the second snapshot data D2. Next, the firmware program is activated (the firmware activation process is performed).

In this case, as shown also in the middle section of FIG. 11, following the startup screens G0 and G1, the startup screens G3 and G4 are sequentially displayed, and the operation screen G5 is then displayed. Note that FIG. 14 is an enlarged view of the state at and after time T31 of FIG. 9. FIG. 14 shows the state in which the advance notice screen G4 is displayed a few seconds before the operation screen G5.

In particular, if a determination is made to perform the second high-speed startup process, the advance notice screen G4 is displayed (time T46) in the firmware activation process period after the hardware initialization process in response to the power-on operation is completed and after the second snapshot developing process is completed. Then, at time T47, which is a few seconds after the display start time of the advance notice screen G4 (time T46), the operation screen G5 is displayed (see FIG. 14).

Further, if it is determined that the first high-speed startup process should be performed, the process goes to step S61 via step S55.

In step S61, the drawing process (the display process) of the advance notice screen G4 is performed. Here, the step S61 is a process performed in the boot process period (in the period of the processing by the boot program).

After that, in and after step S62, the developing process (the write-back process) of the first snapshot data D1 is subsequently performed (see FIGS. 6 and 8). Specifically, in step S62, a specific program for the first high-speed startup process is called from the boot program and activated, and the specific program performs the first high-speed startup process. More specifically, the MFP 10 performs the developing process of developing the snapshot data D1 stored in the eMMC 33. That is, the MFP 10 starts up the MFP 10 itself quickly, using the first snapshot data D1.

In detail, the MFP 10 puts (transfers) the snapshot data D1 (the saving target information) saved (stored) in advance in the eMMC 33 back in the RAM 32. Further, the MFP 10 puts each of the pieces of saving target information about the target devices (the devices 20, 22, 23, 25, and the like) of the developing process from the RAM 32 back in the corresponding hardware (the register, the memory, and the like in each device). By the developing process described above, the main body part (the device 20) of the MFP 10 and the devices 22, 23, and 25 are returned back to the state at the time of the immediately preceding power-off operation (time T21).

In this case, as shown also in the uppermost section of FIG. 11, after the advance notice screen G4 is displayed in step S61 following the startup screens G0 and G1 and when the developing process of the first snapshot data D1 is farther completed, the operation screen G5 is displayed. Note that FIG. 13 is an enlarged view of the state at and after time T31 of FIG. 8. FIG. 13 shows the state in which the advance notice screen G4 is displayed a few seconds before the operation screen G5.

In particular, if a determination is made in step S54 to perform the first high-speed startup process using the first snapshot data D1, the advance notice screen G4 is displayed in step S61 immediately after the hardware initialization process is completed. Then, at time T45, which is a few seconds after the completion of the display of the advance notice screen G4 (time T36), the operation screen G5 is displayed (see FIG. 13).

Further, in the operation as described above, as can be understood by comparing FIG. 13 through FIG. 15 with one another, the advance notice screen G4 is displayed at about a few seconds before the operation screen G5 is displayed regardless of which one of the three types of startup processes is performed. Therefore, even when any of the startup processes is performed after a power-on operation, the MFP 10 can accurately notify the user of the information about the transition to the operable state.

Figure 23:
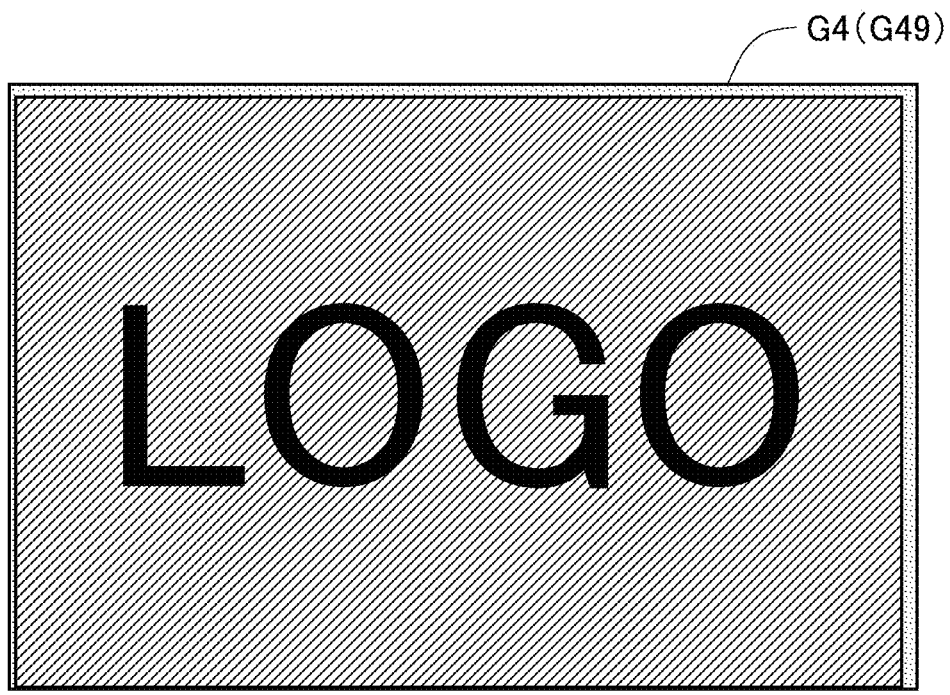
FIG. 23 is a diagram showing an advance notice screen according to a modified example.

Note that in the above embodiment, as the advance notice screen G4, a screen is used in which a logo is added to a part of the screen having been displayed on the operation panel unit 22 until immediately before; however, the advance notice screen G4 is not limited to this screen. For example, a screen may be used as the advance notice screen G4, in which screen the entire screen of the operation panel unit 22 is newly changed to a new content. In more detail, as shown in FIG. 23, it is possible to use as the advance notice screen G4 a screen G49 in which a logo is displayed on the entire area of the operation panel unit 22.

Alternatively, instead of the logo or together with the logo, wordings such as "Startup to be completed within three seconds" may be displayed in the advance notice screen G4 so as to express that the startup process will be completed soon.

<5. Detailed Description About Displaying Screen During Starting Up>

In the above embodiment, at the time of displaying the startup screens G1, G3, and G4, image data showing the entire of each of the screens may be used without being limited thereto. For example, each of the screens may be displayed such that image data of a partial area of the entire screen already displayed on the operation panel unit 22 is updated by overwriting (in other words, by using the differential data with respect to the screen having been displayed until then).

Figure 24:
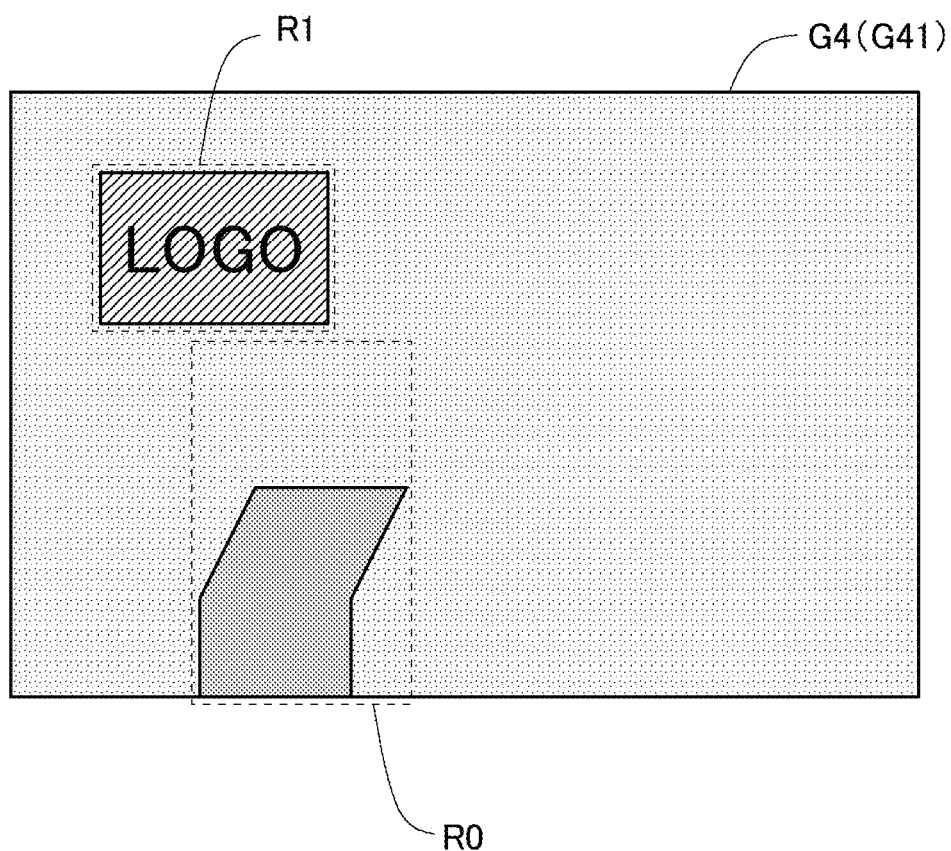
FIG. 24 is a diagram showing a differential area and the like updated by overwriting.

Specifically, at the time of displaying the screen G4 (G41) (see FIG. 22), it is also possible to update by overwriting the image data in the partial area (a differential area) R1 (see FIG. 24) related to the difference between the screen G1 (FIG. 17) already displayed on the operation panel unit 22 and the screen G4 after update. Similarly, at the time of displaying the screen G4 (G45) (see FIG. 20), it is also possible to update by overwriting the image data in the partial area (the differential area) related to the difference between the screen G35 (FIG. 19) already displayed on the operation panel unit 22 and the screen G45 after update.

By the above manner, it is possible to make the time required for drawing shorter than in the case that the image data of the entire screen of the operation panel unit 22 is updated. For example, it takes about one second to update the image data of the entire screen of the operation panel unit 22; however, in the case of updating by overwriting the image data of a partial area, it takes about one hundred milliseconds to a few hundred milliseconds (about one tenth to a few tenths). That is, it is possible to prevent or reduce prolongation of the startup process time.

Similarly, at the time of displaying the screen G1, it is also possible to update by overwriting the image data in the partial area R0 (the differential area) related to the difference between the screen G0 already displayed on the operation panel unit 22 and the screen G1 after update.

Note that, in particular, by reducing the drawing time of the screen G41 (and the screen G1 and other screens) in the boot process period in which a single task is performed, it is possible to significantly prevent or reduce the prolongation of the startup process time.

Further, in the above embodiment and the like, only one kind of logo is prepared for the logo to be used for the advance notice screen G4; however, the present invention is not limited to this embodiment, a plurality of logos may be prepared. In other words, it is also possible to use as the advance notice screen G4 a screen selected from a plurality of screens related to a plurality of logos.

Figure 25:
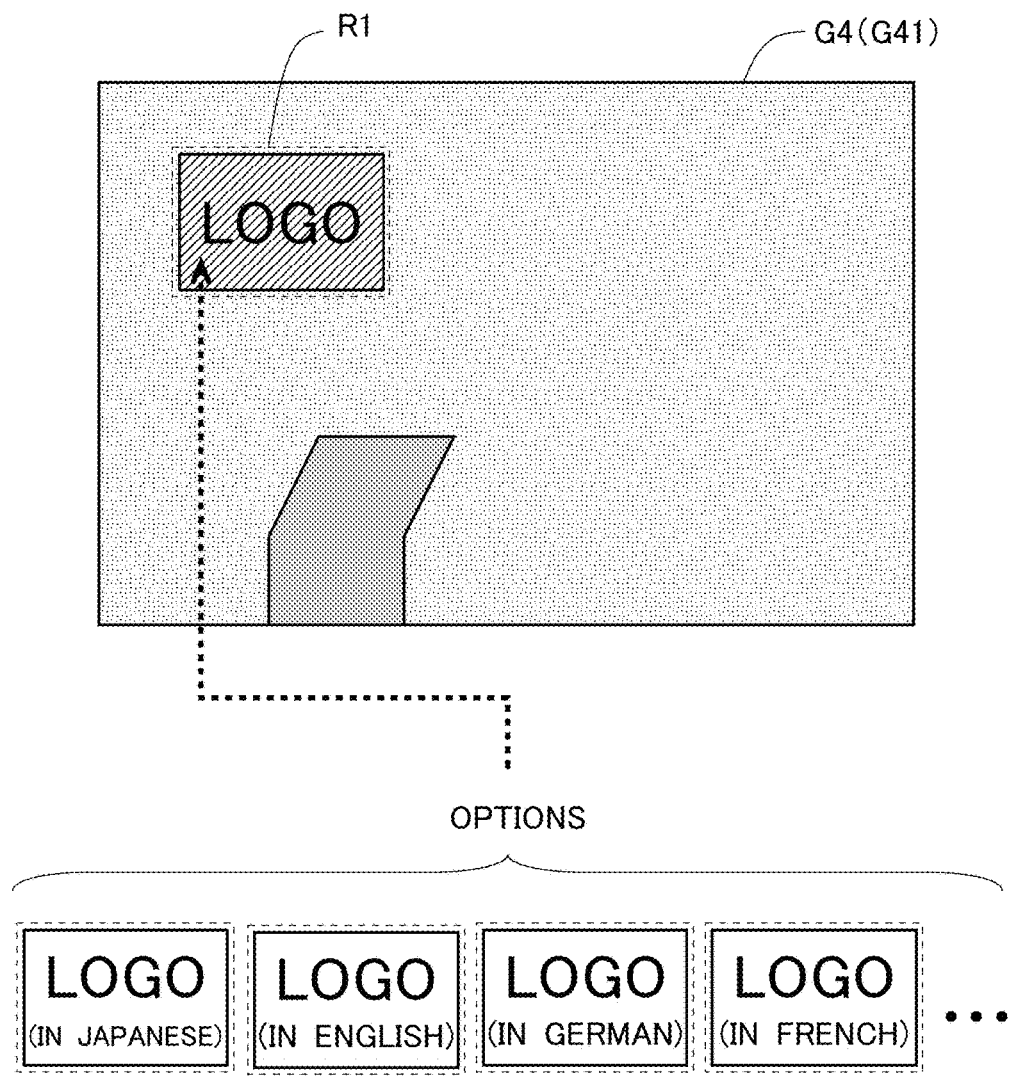
FIG. 25 is a diagram showing an advance notice screen including one logo selected from a plurality of logos.

For example, as shown in FIG. 25, it is also possible to prepare a plurality of logos which are different from one another and are written in different languages or the like. Specifically, in the eMMC 33 there are stored in advance a plural pieces of small image data (logo images) each of which is for a partial area R1 related to each of the plurality of screens corresponding to the plurality of logos and depends on each of the plurality of screens. Then, when causing one screen selected from the plurality of screens to be displayed as the advance notice screen G4, the MFP 10 causes the advance notice screen G4 to be displayed by overwriting the partial area R1 with small image data (a logo image), corresponding to the one screen, of the plural pieces of small image data (the plurality of logo images). According to the aspect as described above, a plurality of logos can be selectively used appropriately.

Note that when characters such as "Startup to be completed within three seconds" are used instead of a logo or together with a logo, the advance notice screen G4 may be displayed by overwriting a partial area with one piece of small image data selected from a plural pieces of small image data which are prepared in advance and in which the characters are expressed in different languages.

<6. Modified Examples and the Like>

Although the embodiment of the present invention has been described above, the present invention is not limited to the above.

For example, in the above embodiment and the like, the process of drawing the advance notice screen G4 is performed immediately after the hardware initialization process period (from time T31 to time T34) is completed (see FIG. 12); however, the present invention is not limited to this operation, the process of drawing the screen G4 may be performed in hardware initialization process period. For example, if a third hardware initialization process other than the second hardware initialization process is also performed as the boot process (by the boot program), the process of drawing the advance notice screen G4 may be performed in the hardware initialization process period including the period of the second hardware initialization process and the third hardware initialization process. In more detail, the process of drawing the advance notice screen G4 may be performed immediately after the second hardware initialization process and immediately before the third hardware initialization process.

Further, in FIGS. 8 to 10, an aspect is described as an example, and in the aspect, after the normal startup process is first performed from time T1 to time T9, any one of the three types of startup processes is performed; however, the present invention is not limited to this aspect. Each of the three types of startup processes may be performed after any high-speed startup process (the first or the second high-speed startup process) other than the normal startup process is performed. For example, after startup is performed by the first high-speed startup process from time T1 to time T9, the process at and after time T21 in each of FIGS. 8 to 10 may be performed. Similarly, after startup is performed by the second high-speed startup process from time T1 to time T9, the process at and after time T21 in each of FIGS. 8 to 10 may be performed.

Further, in the above embodiment and the like, only when the device configuration has been changed, the normal startup process of the three types of startup processes is performed; however, the present invention is not limited to this operation, and the normal startup process may be performed in other cases, for example, in the case that the apparatus is set to a service mode (a mode for a service person's check). Further, the first high-speed startup process and the second high-speed startup process each may be performed when various conditions other than the above conditions are satisfied.

Further, in the above embodiment and the like, an aspect is disclosed in which the three types of startup processes can be performed; however, the present invention is not limited to this aspect. For example, only one of the first high-speed startup process and the normal startup process can be performed as the startup process.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:
a volatile storage;
a nonvolatile storage;
a main power switch;
a hardware processor; and
a display,
wherein: the hardware processor tries to obtain, from the volatile storage, saving target information related to the image forming apparatus in a power supply continuation period from a time of a power-off operation to a time of power supply interruption, and to store the saving target information in the nonvolatile storage as first snapshot data for restoring a state at a predetermined time after firmware of the image forming apparatus is activated,
the hardware processor determines, when a power-on operation is performed in response to operation of the main power switch after the time of the power-off operation, whether to perform a first high-speed startup process using the first snapshot data as an apparatus startup process with respect to the image forming apparatus, and
when a determination is made to perform the first high-speed startup process using the first snapshot data, the hardware processor causes the display to display, in a period in which a hardware initialization process in response to the power-on operation is being performed or immediately after the hardware initialization process is completed, an advance notice screen to be displayed at a predetermined time before completion of startup in response to the power-on operation, the advance notice screen including at least one of a logo and a message and giving an advance notice that a transition from a power-off state to a user operable state following the power-on operation will be completed.

2. The image forming apparatus according to claim 1, wherein when a determination is made not to perform the first high-speed startup process using the first snapshot data, the hardware processor causes the advance notice screen to be displayed in a period in which a firmware activation process is being performed after the hardware initialization process in response to the power-on operation is completed, and
wherein when a determination is made to perform the first high-speed startup process using the first snapshot data, the hardware processor causes the advance notice screen to be displayed in a period in which the hardware initialization process is being performed or immediately after the hardware initialization process is completed.

3. The image forming apparatus according to claim 2, wherein:
the nonvolatile storage stores second snapshot data different from the first snapshot data and for restoring a state at a time immediately after a kernel activation process is completed and immediately before the firmware activation process is started,
when a determination is made, due to a first condition not being satisfied, not to perform the first high-speed startup process, the hardware processor determines to perform a normal startup process including the kernel activation process and the firmware activation process, and
when a determination is made, due to a second condition not being satisfied, not to perform the first high-speed startup process, the hardware processor determines to perform a second high-speed startup process that uses the second snapshot data and that includes a second snapshot developing process of writing the second snapshot data from the nonvolatile storage back in the volatile storage and includes the firmware activation process.

4. The image forming apparatus according to claim 3, wherein:
when a determination is made to perform the normal startup process, the hardware processor causes the advance notice screen to be displayed in a period in which the firmware activation process is being performed after the hardware initialization process in response to the power-on operation is completed and after the kernel activation process is completed,
when a determination is made to perform the second high-speed startup process, the hardware processor causes the advance notice screen to be displayed in a period in which the firmware activation process is being processed after the hardware initialization process in response to the power-on operation is completed and after the second snapshot developing process is completed, and
when a determination is made to perform the first high-speed startup process using the first snapshot data, the hardware processor causes the advance notice screen to be displayed in the period in which the hardware initialization process is being performed or immediately after the hardware initialization process is completed.

5. The image forming apparatus according to claim 3, wherein the hardware processor determines to perform the first high-speed startup process or the second high-speed startup process under a condition that device configuration information at a time of the power-on operation is identical with device configuration information at the time of the power-off operation.

6. The image forming apparatus according to claim 3, wherein:
when the device configuration information at a time of the power-on operation is identical with the device configuration information at the time of the power-off operation and the first snapshot data stored in the nonvolatile storage is valid, the hardware processor determines to perform the first high-speed startup process using the first snapshot data,
when the device configuration information at the time of the power-on operation is identical with the device configuration information at the time of the power-off operation and the first snapshot data stored in the nonvolatile storage is not valid, the hardware processor determines to perform the second high-speed startup process using the second snapshot data, and when the device configuration information at the time of the power-off operation and the device configuration information at the time of the power-on operation are different, the hardware processor determines to perform the normal startup process.

7. The image forming apparatus according to claim 1, wherein the hardware processor determines to perform the first high-speed startup process using the first snapshot data under a condition that the first snapshot data stored in the nonvolatile storage is valid.

8. The image forming apparatus according to claim 1, wherein the hardware processor causes the display to display a power-on operation reception notification screen indicating that the power-on operation has been received, after the power-on operation and before a determination process in which a determination is made on whether to perform the first high-speed startup process.

9. The image forming apparatus according to claim 1, wherein the hardware processor causes the advance notice screen to be displayed by updating, by overwriting, image data in a partial area of an entire screen already displayed on the display.

10. The image forming apparatus according to claim 9, wherein:
   the hardware processor uses a plurality of screens as the advance notice screen,
   the hardware processor has a plurality of pieces of small image data each of which is for the partial area related to a respective one of the plurality of screens and each of which corresponds to a respective one of the plurality of screens, and
   when causing one screen selected from the plurality of screens to be displayed as the advance notice screen, the advance notice screen is caused to be displayed by overwriting the partial area with small image data, from among the plurality of pieces of small image data, corresponding to the one screen.

11. A non-transitory computer-readable recording medium that records a program for causing a computer installed in an image forming apparatus to perform:
   a) trying to obtain, from a volatile storage of the image forming apparatus, saving target information related to the image forming apparatus in a power supply continuation period from a time of a power-off operation to a time of power supply interruption, and to store the saving target information in a nonvolatile storage of the image forming apparatus as first snapshot data for restoring a state at a predetermined time after firmware of the image forming apparatus is activated;
   b) determining, when a power-on operation is performed in response to operation of a main power switch of the image forming apparatus after the time of the power-off operation, whether to perform a first high-speed startup process using the first snapshot data as an apparatus startup process with respect to the image forming apparatus; and
   c) causing a display of the image forming apparatus to display an advance notice screen to be displayed at a predetermined time before completion of startup in response to the power-on operation, the advance notice screen including at least one of a logo and a message and giving an advance notice that a transition from a power-off state to a user operable state following the power-on operation will be completed,
   wherein in the step c), when a determination is made to perform the first high-speed startup process using the first snapshot data, the advance notice screen is displayed on the display in a period in which a hardware initialization process in response to the power-on operation is being performed or immediately after the hardware initialization process is completed.

12. The non-transitory computer-readable recording medium according to claim 11, wherein the step c) includes:
   c-1) causing, when a determination is made not to perform the first high-speed startup process using the first snapshot data, the advance notice screen to be displayed in a period in which a firmware activation process is being performed after the hardware initialization process in response to the power-on operation is completed; and
   c-2) causing, when a determination is made to perform the first high-speed startup process using the first snapshot data, the advance notice screen to be displayed in a period in which the hardware initialization process is being performed or immediately after the hardware initialization process is completed.

13. The non-transitory computer-readable recording medium according to claim 12, wherein the step b) includes:
   b-1) making, when a determination is made, due to a first condition not being satisfied, not to perform the first high-speed startup process, a determination to perform a normal startup process including a kernel activation process and the firmware activation process; and
   b-2) making, when a determination is made, due to a second condition not being satisfied, not to perform the first high-speed startup process, a determination to perform a second high-speed startup process that uses second snapshot data stored in nonvolatile storage and that includes a second snapshot developing process of writing the second snapshot data from the nonvolatile storage back in the volatile storage and includes the firmware activation process,
   wherein the second snapshot data is snapshot data for restoring a state at a time immediately after the kernel activation process is completed and immediately before the firmware activation process is started.

14. The non-transitory computer-readable recording medium according to claim 13, wherein the step c-1) includes:
   c-1-1) causing, when a determination is made to perform the normal startup process, the advance notice screen to be displayed in a period in which the firmware activation process is being performed after the hardware initialization process in response to the power-on operation is completed and after the kernel activation process is completed; and
   c-1-2) causing, when a determination is made to perform the second high-speed startup process, the advance notice screen to be displayed in a period in which the firmware activation process is being processed after the hardware initialization process in response to the power-on operation is completed and after the second snapshot developing process is completed.

15. The non-transitory computer-readable recording medium according to claim 13, wherein in the step b), a determination is made to perform the first high-speed startup process or the second high-speed startup process under a condition that device configuration information at a time of the power-on operation is identical with device configuration information at the time of the power-off operation.

16. The non-transitory computer-readable recording medium according to claim 13, wherein in the step b), when the device configuration information at a time of the power-on operation is identical with the device configuration information at the time of the power-off operation and the first snapshot data stored in the nonvolatile storage is valid, a determination is made to perform the first high-speed startup process using the first snapshot data, when the device configuration information at the time of the power-on operation is identical with the device configuration information at the time of the power-off operation and the first snapshot data stored in the nonvolatile storage is not valid, a determination is made to perform the second high-speed startup process using the second snapshot data, and when the device configuration information at the time of the power-off operation and the device configuration information at the time of the power-on operation are different, a determination is made to perform the normal startup process.

17. The non-transitory computer-readable recording medium according to claim 11, wherein in the step b), a determination is made to perform the first high-speed startup process using the first snapshot data under a condition that the first snapshot data stored in the nonvolatile storage is valid.

18. The non-transitory computer-readable recording medium according to claim 11, wherein the program further causes the computer to perform d) causing a power-on operation reception notification screen to be displayed after the power-on operation and before the step b), the power-on operation reception notification screen indicating that the power-on operation has been received.

19. The non-transitory computer-readable recording medium according to claim 11, wherein in the step b), the advance notice screen is displayed by updating, by overwriting, image data in a partial area of an entire screen already displayed.

20. The non-transitory computer-readable recording medium according to claim 19, wherein in the step c), when causing one screen, which is selected from a plurality of screens usable as the advance notice screen, to be displayed as the advance notice screen, the advance notice screen is displayed by overwriting the partial area with small image data corresponding to the one screen, from among a plurality of pieces of small image data each of which corresponds to a respective one of the plurality of screens and is for the partial area of the respective one of the plurality of screens.

* * * * *